(12) United States Patent
Cook et al.

(10) Patent No.: US 8,763,639 B2
(45) Date of Patent: Jul. 1, 2014

(54) ELECTRONICALLY CONTROLLED VALVE AND SYSTEMS CONTAINING SAME

(75) Inventors: Daniel S. Cook, Terryville, CT (US);
Michael J. Elmoznino, Lyme, CT (US);
Blake D. Carter, Norwalk, CT (US)

(73) Assignee: Enfield Technologies, LLC, Trumbull, CT (US)

( * ) Notice: Subject to any disclaimer, the term of this patent is extended or adjusted under 35 U.S.C. 154(b) by 1453 days.

(21) Appl. No.: 12/154,054

(22) Filed: May 19, 2008

(65) Prior Publication Data

US 2009/0001305 A1 Jan. 1, 2009

Related U.S. Application Data

(60) Provisional application No. 60/930,846, filed on May 18, 2007, provisional application No. 61/067,444, filed on Feb. 27, 2008.

(51) Int. Cl.
*F16F 9/346* (2006.01)

(52) U.S. Cl.
CPC ...................... *F16F 9/346* (2013.01)
USPC ............... 137/625.37; 188/266.5; 188/322.15

(58) Field of Classification Search
USPC ............... 137/625.3, 625.33, 625.37, 625.48; 188/266, 266.5, 299.1, 313, 322.15
See application file for complete search history.

(56) References Cited

U.S. PATENT DOCUMENTS

| | | | |
|---|---|---|---|
| 4,399,836 A | 8/1983 | de Versterre et al. | 137/487.5 |
| 4,846,317 A * | 7/1989 | Hudgens | 188/266.5 |
| 4,905,798 A * | 3/1990 | Engelsdorf et al. | 188/266.5 |
| 4,915,168 A | 4/1990 | Upchurch | 166/250 |
| 4,958,704 A | 9/1990 | Leiber et al. | 188/285 |
| 4,973,854 A * | 11/1990 | Hummel | 267/64.26 |
| 5,101,862 A | 4/1992 | Leete | 137/899 |
| 5,176,164 A | 1/1993 | Boyle | 137/155 |
| 5,251,730 A * | 10/1993 | Ackermann et al. | 188/315 |

(Continued)

FOREIGN PATENT DOCUMENTS

| | | |
|---|---|---|
| DE | 4007261 A1 | 9/1991 |
| JP | 03177634 A | 8/1991 |

(Continued)

OTHER PUBLICATIONS

Data sheet SLOS401A, Sep. 2002 (revised Oct. 2002) for the DRV593/DRV594 from Texas Instruments.

(Continued)

*Primary Examiner* — John Fox
(74) *Attorney, Agent, or Firm* — Harrington & Smith

(57) ABSTRACT

Disclosed herein is a controlled valve. The valve includes a valve body, a sleeve, a spool, and a valve actuator assembly. The valve body includes a cavity and a first chamber. The sleeve is between the cavity and the first chamber. The sleeve includes an inner bore and at least one opening. The inner bore extends from a first end to a second end of the sleeve. The at least one opening extends through the second end of the sleeve. A portion of the inner bore forms a second chamber. The spool is movably disposed within the inner bore. The valve actuator assembly is connected to the spool. The first chamber is in fluid communication with the second chamber through the at least one opening. The spool is configured to be movable over at least a portion of the at least one opening to regulate fluid flow therethrough.

20 Claims, 30 Drawing Sheets

(56) References Cited

U.S. PATENT DOCUMENTS

| | | | | |
|---|---|---|---|---|
| 5,285,878 A | * | 2/1994 | Scheffel et al. | 188/282.2 |
| 5,301,776 A | | 4/1994 | Beck | 188/322.13 |
| 5,386,893 A | * | 2/1995 | Feigel | 188/266.5 |
| 5,427,147 A | * | 6/1995 | Henriksson | 137/625.3 |
| 5,460,201 A | | 10/1995 | Borcea et al. | 137/625.65 |
| 5,462,142 A | * | 10/1995 | Handke et al. | 188/313 |
| 5,472,070 A | * | 12/1995 | Feigel | 188/266.6 |
| 5,487,455 A | | 1/1996 | Feigel | 188/299 |
| 5,551,541 A | * | 9/1996 | Forster | 188/317 |
| 5,960,831 A | | 10/1999 | Borcea et al. | 137/625.65 |
| 6,135,250 A | * | 10/2000 | Forster et al. | 188/266.5 |
| 6,374,857 B1 | | 4/2002 | Linkenbach | 137/627.5 |
| 6,662,784 B1 | | 12/2003 | Breenden | 123/446 |
| 6,871,574 B2 | | 3/2005 | Barber | 91/420 |
| 7,322,375 B2 | | 1/2008 | Goldfarb et al. | 137/625.32 |
| 2002/0017327 A1 | | 2/2002 | Kawaai et al. | 137/625.3 |
| 2005/0028763 A1 | | 2/2005 | Diehl et al. | 123/90.15 |
| 2005/0092952 A1 | | 5/2005 | McCarroll et al. | 251/129.18 |
| 2006/0037467 A1 | | 2/2006 | McCarroll et al. | 91/361 |
| 2007/0095312 A1 | | 5/2007 | Vanderpoel et al. | 123/90.16 |
| 2008/0099069 A1 | | 5/2008 | Cook | 137/14 |
| 2008/0099087 A1 | | 5/2008 | Cook et al. | 137/596.17 |
| 2008/0099090 A1 | | 5/2008 | Cook | 137/625.65 |
| 2008/0099705 A1 | | 5/2008 | Cook et al. | 251/129.01 |
| 2008/0099706 A1 | | 5/2008 | Cook et al. | 251/129.01 |
| 2008/0099714 A1 | | 5/2008 | Cook | 251/341 |
| 2008/0129364 A1 | | 6/2008 | Cook | 327/307 |

FOREIGN PATENT DOCUMENTS

| | | |
|---|---|---|
| JP | 05-096642 | 12/1993 |
| JP | 06-294433 | 10/1994 |
| JP | 2001-511499 A | 8/2001 |
| JP | 2002-106730 A | 4/2002 |
| WO | WO-2009/088504-1 A | 7/2009 |

OTHER PUBLICATIONS

Data sheet SBOs120, entitled "INA-145" and subtitled "Programmable Gain Difference Amplifier" (Mar. 2000 printing date), from Burr-Brown.

Data Sheet DS39598E, entitled "PIC16F818/819 Data Sheet" and subtitled "18/20-Pin Enhanced Flash Microcontrollers with nanoWatt Technology" (2004), from Microchip.

Data sheet 29319.37H, entitled "3949" and subtitled DMOS Full-Bridge PWM Motor Driver (no date given), from Allegro Microsystems, Inc.

Data Sheet SBOS105, entitled "INA157" and subtitled "High-Speed, Precision Difference Amplifier", (Mar. 1999 printing date), from Burr-Brown.

Bellofram Rolling Diaphragm Design Manual (pp. 1-6, Dec. 2006).

* cited by examiner

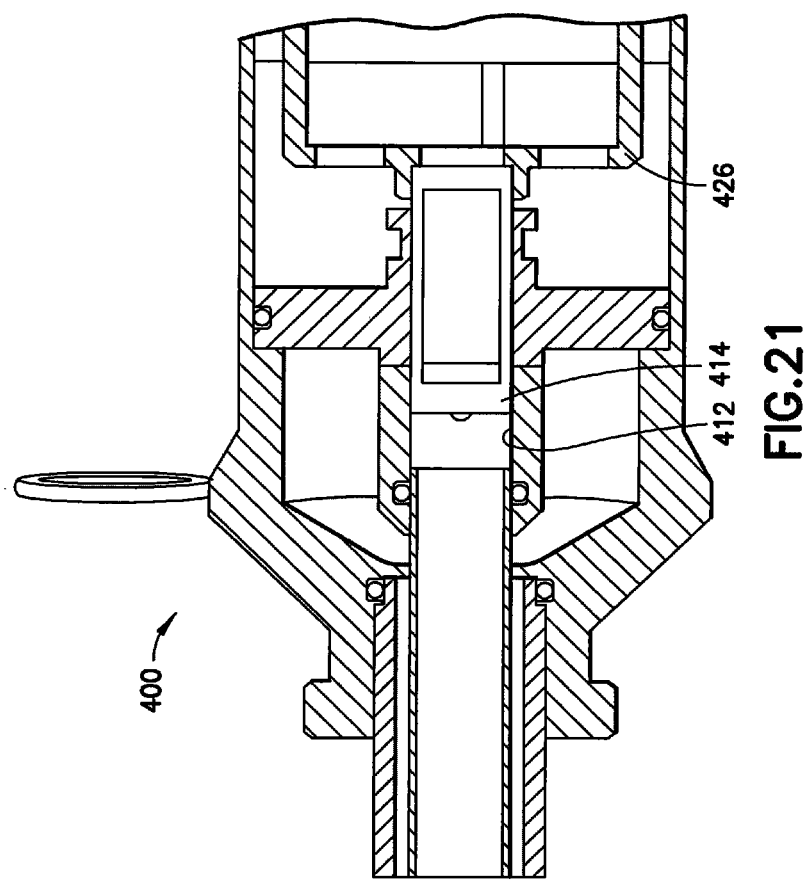

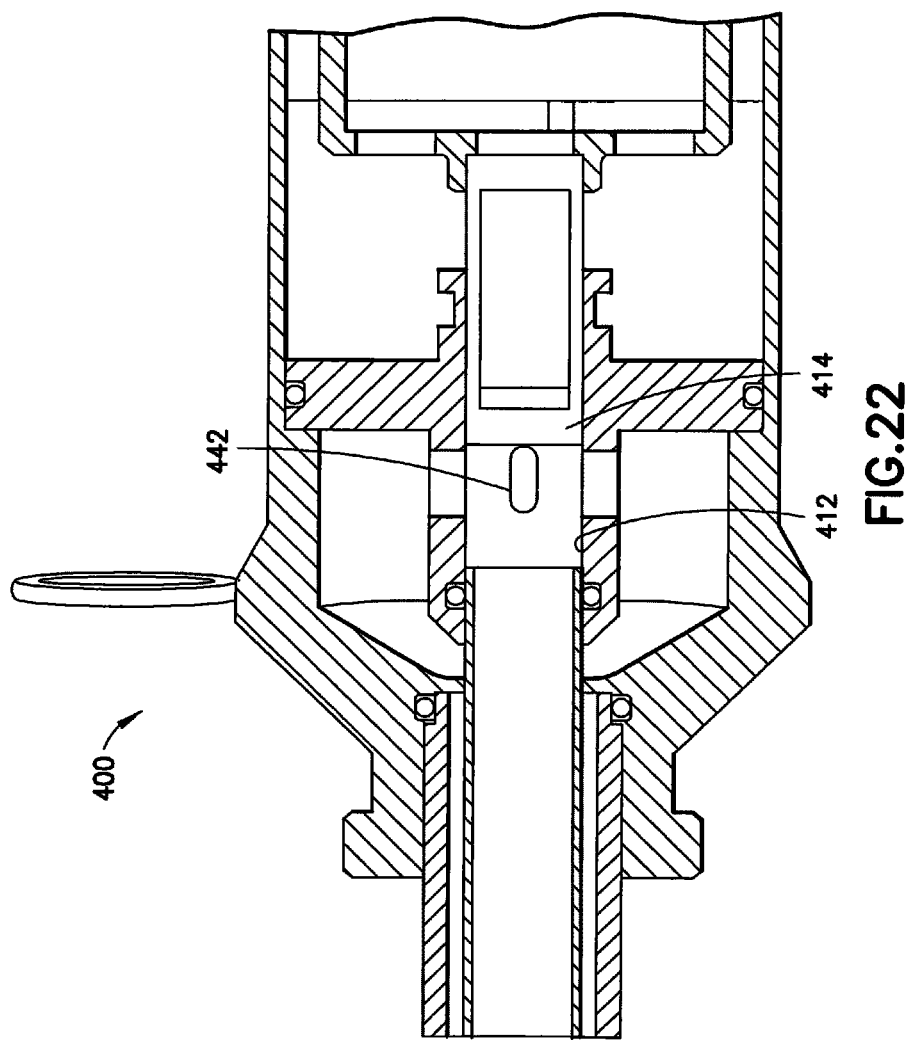

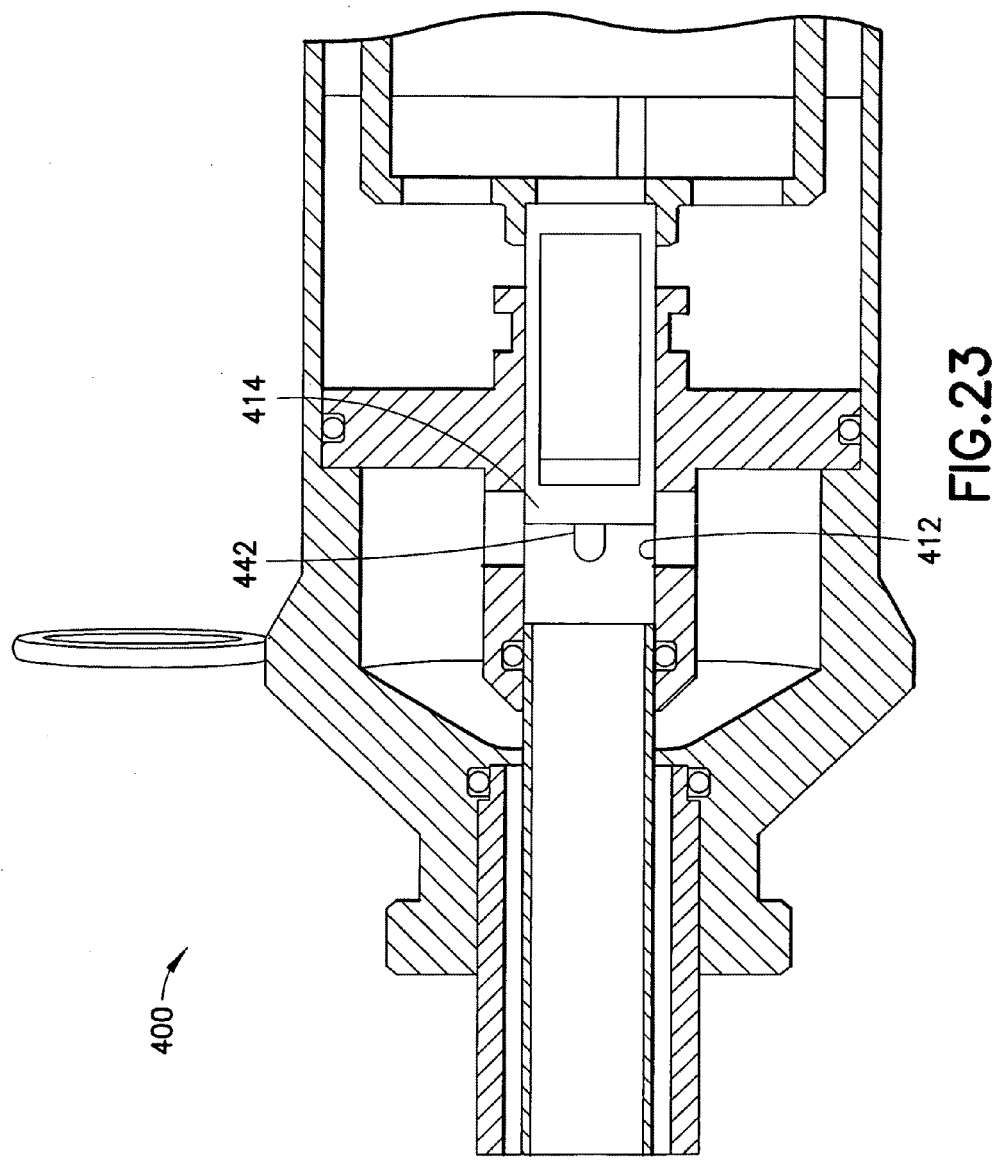

ELECTRONICALLY CONTROLLED VALVE AND SYSTEMS CONTAINING SAME

CROSS REFERENCE TO RELATED APPLICATION

This application claims priority under 35 U.S.C. §119(e) to U.S. provisional patent application No. 60/930,846 filed May 18, 2007 and U.S. provisional patent application No. 61/067,444 filed Feb. 27, 2008, which are hereby incorporated by reference in their entireties.

BACKGROUND OF THE INVENTION

1. Field of the Invention

The invention relates to a valve and, more particularly, to an electronically controlled valve.

2. Brief Description of Prior Developments

Electronically controlled valves have many uses in controlling fluids such as air, oil, and water. However, these valves and the systems using them could be improved. As many of the systems utilizing controlled valves become more sophisticated, the controlled valves provide an increasing amount of functionality. Additionally, many of these systems and/or valves are confined to smaller and smaller spaces. Decreasing overall geometry while continuing to provide improved capabilities/functionality and maintaining robust and reliable product configurations creates various challenges in controlled valves.

Accordingly, there is a need to provide an improved electronically controlled valve.

SUMMARY OF THE INVENTION

In accordance with one aspect of the invention, a controlled valve is disclosed. The controlled valve includes a valve body, a sleeve, a spool, and a valve actuator assembly. The valve body includes a cavity and a first chamber. The sleeve is between the cavity and the first chamber. The sleeve includes an inner bore and at least one opening. The inner bore extends from a first end of the sleeve to a second end of the sleeve. The at least one opening extends through the second end of the sleeve. A portion of the inner bore proximate the second end forms a second chamber. The spool is movably disposed within the inner bore of the sleeve. The valve actuator assembly is connected to the spool. The first chamber is in fluid communication with the second chamber through the at least one opening. The spool is configured to be movable over at least a portion of the at least one opening to regulate fluid flow therethrough.

In accordance with another aspect of the invention, a servo valve is disclosed. The servo valve includes a valve body, a valve actuator assembly, a sleeve, and a spool. The valve body includes a first end, a second end, and a first interface at the second end. The first interface is configured to receive a first conduit. The valve actuator assembly is disposed inside the valve body proximate the first end. The sleeve is fixedly mounted inside the valve body. The sleeve includes an inner bore and at least one opening. A portion of the inner bore includes a second interface. The second interface is configured to receive a second conduit extending through the first interface. The at least one opening is configured to allow fluid flow between the first conduit and the second conduit. The sleeve is between the valve actuator and the first interface. The spool is slidably connected to the inner bore of the sleeve. The spool is attached to the valve actuator.

In accordance with yet another aspect of the invention, a method of manufacturing a controlled valve is disclosed. A valve body having a cavity and a first chamber is provided. A sleeve is mounted between the cavity and the first chamber. The sleeve includes an inner bore and at least one opening. The inner bore extends from a first end of the sleeve to a second end of the sleeve. The at least one opening extends through the second end of the sleeve. A portion of the inner bore proximate the second end forms a second chamber. A spool is movably connected within the inner bore of the sleeve. A valve actuator assembly is connected to the spool. The first chamber is in fluid communication with the second chamber through the at least one opening. The spool is configured to be movable over at least a portion of the at least one opening to regulate fluid flow therethrough.

BRIEF DESCRIPTION OF THE DRAWINGS

The foregoing aspects and other features of the invention are explained in the following description, taken in connection with the accompanying drawings, wherein:

FIG. 21 is an enlarged section view of a portion of the exemplary valve shown in FIG. 13 with openings substantially covered (or closed);

FIG. 22 is an enlarged section view of a portion of the exemplary valve shown in FIG. 13 with openings substantially uncovered (or open);

FIG. 23 is an enlarged section view of a portion of the exemplary valve shown in FIG. 13 with openings about half uncovered (or half open);

DETAILED DESCRIPTION OF THE PREFERRED EMBODIMENTS

Figure 1:
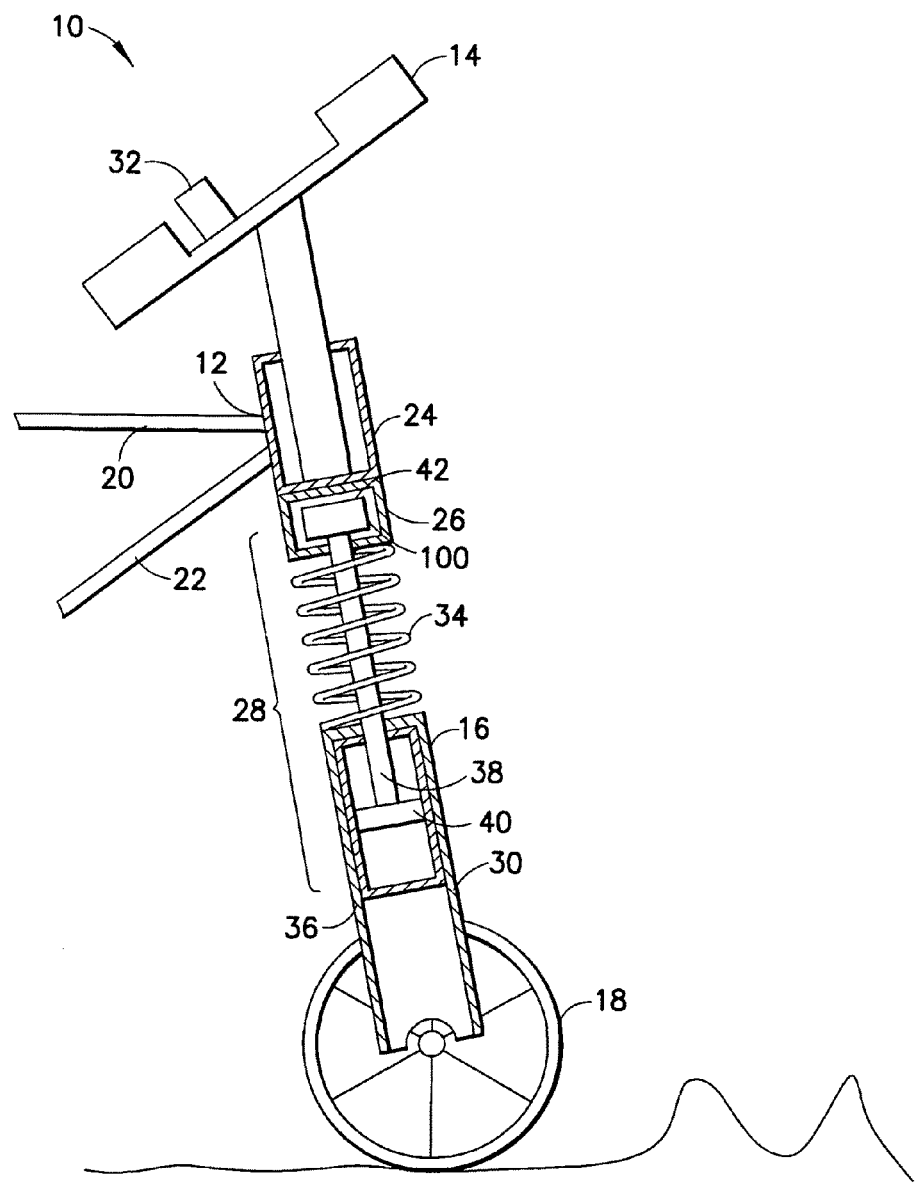
FIG. 1 is a side view of a front end of a bicycle comprising features of the invention.

Referring to FIG. 1, there is shown a side view of a front end of a bicycle 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

The bicycle 10 includes a frame 12, handle bars 14, a fork assembly 16, and a wheel 18. The frame includes a top tube 20, a down tube 22, and a head tube 24. The handle bars 14 are connected to the head tube 24. The handle bars 14 may comprise a stem and steering tube, for example. The fork assembly 16 may be connected to the head tube 24 opposite the handle bars 14. The fork assembly 14 includes a fork head 26, a suspension system 28, and a fork tube 30. The wheel 18 is connected to the fork tube 30.

The suspension system 28 may be a computer controlled electro-hydraulic Active Suspension Damping System (ASDS). The suspension system 28 may include a ride control module 32, an electronic fluid control system (EFCS) 100, a spring 34, a damper tube 36, a damper shaft 38, and a damper piston 40. The ride control module 32 may be attached to the handle bars 14. However, any suitable location for the ride control module may be provided. The EFCS 100 may be adjacent to an ASDS control computer 42, wherein the EFCS 100 and the ASDS control computer 42 are both proximate the fork head 26. The EFCS 100 and the ASDS control computer 42 may also be mounted inside the fork head 26. However, the EFCS 100 and the ASDS control computer 42 may be disposed in any suitable location. The spring 34 may be provided between the fork head 26 and the fork tube 30. The damper tube 36 may be disposed within the fork tube 30. The damper shaft 38 and the damper piston 40 may be connected between the damper tube 36 and the fork head 26. The damper shaft 38 may also be connected to the EFCS 100. It should be noted that the handle bars 14, the fork assembly 16 and wheel 18 may rotate and/or travel up and down relative to the frame 12.

Figure 2:
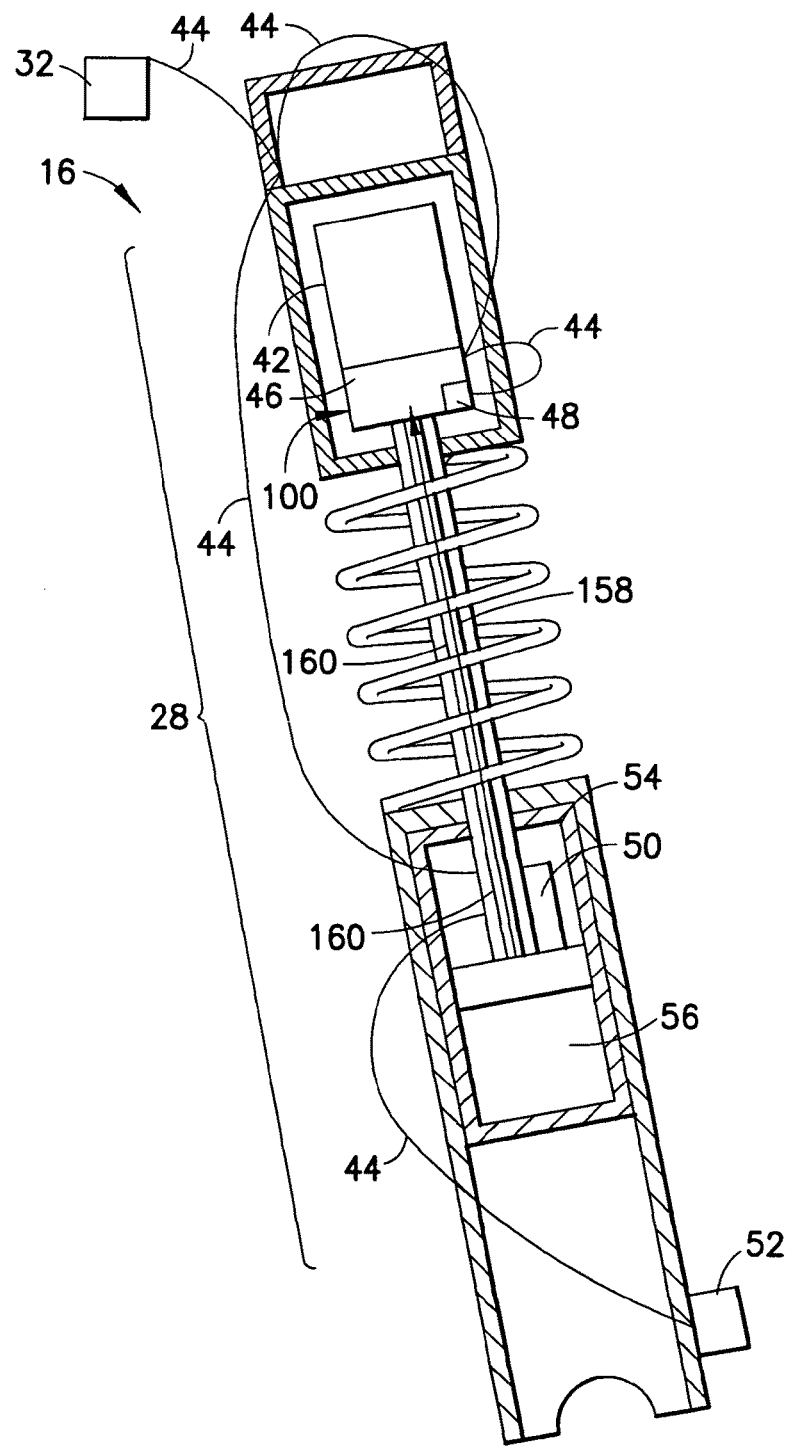
FIG. 2 is a side view of a suspension system used in the bicycle shown in FIG. 1.

Referring now also to FIG. 2, the suspension system 28 is illustrated in further detail. The ASDS computer 42 may feature an embedded high speed central computer with a digital network 44 that connects all the distributed processing computers which are embedded into an EFCS transducer 46, the ride control module (RCM) 32, and sensors in a high bandwidth sensor array. The high bandwidth sensor array may comprise an EFCS aperture sensor 48, a fork travel sensor 50, and a vibration/impact sensor 52, for example. In one embodiment, a rider may set his/her ride preferences on the RCM 32, which may have a miniature joystick and a graphic LCD, for example. The ASDS computer 42 may compare the information in the RCM 32 to the feedback from the fork travel sensor 50 (which may sense travel between an upper fluid chamber 54 and a lower fluid chamber 56, for example), the vibration/impact sensor 52, and the EFCS aperture sensor 48 about every 100 microseconds, for example. Any changes in the rider's settings or the sensors may be computed to adjust the EFCS transducer 46 which changes the stiffness or compliance of the suspension system (or shock absorber) for the optimal ride. The EFCS transducer 46 may control how quickly hydraulic damping fluid can flow between the upper and lower damper chambers 54, 56. Changing the flow rate changes how quickly the spring shock is allowed to compress or rebound. Unlike conventional hydraulic dampers with fixed settings or manual adjustments, the computer is actively changing the flow rate during a compression or rebound to "shape" the shock absorption. The system's ultra-fast components and "real-time" distributed computing configuration may start making changes before the energy wave of a vibration or impact can travel up the fork to reach the damper. In one embodiment, this may occur in about 17 milliseconds (0.017 seconds).

Figure 3:
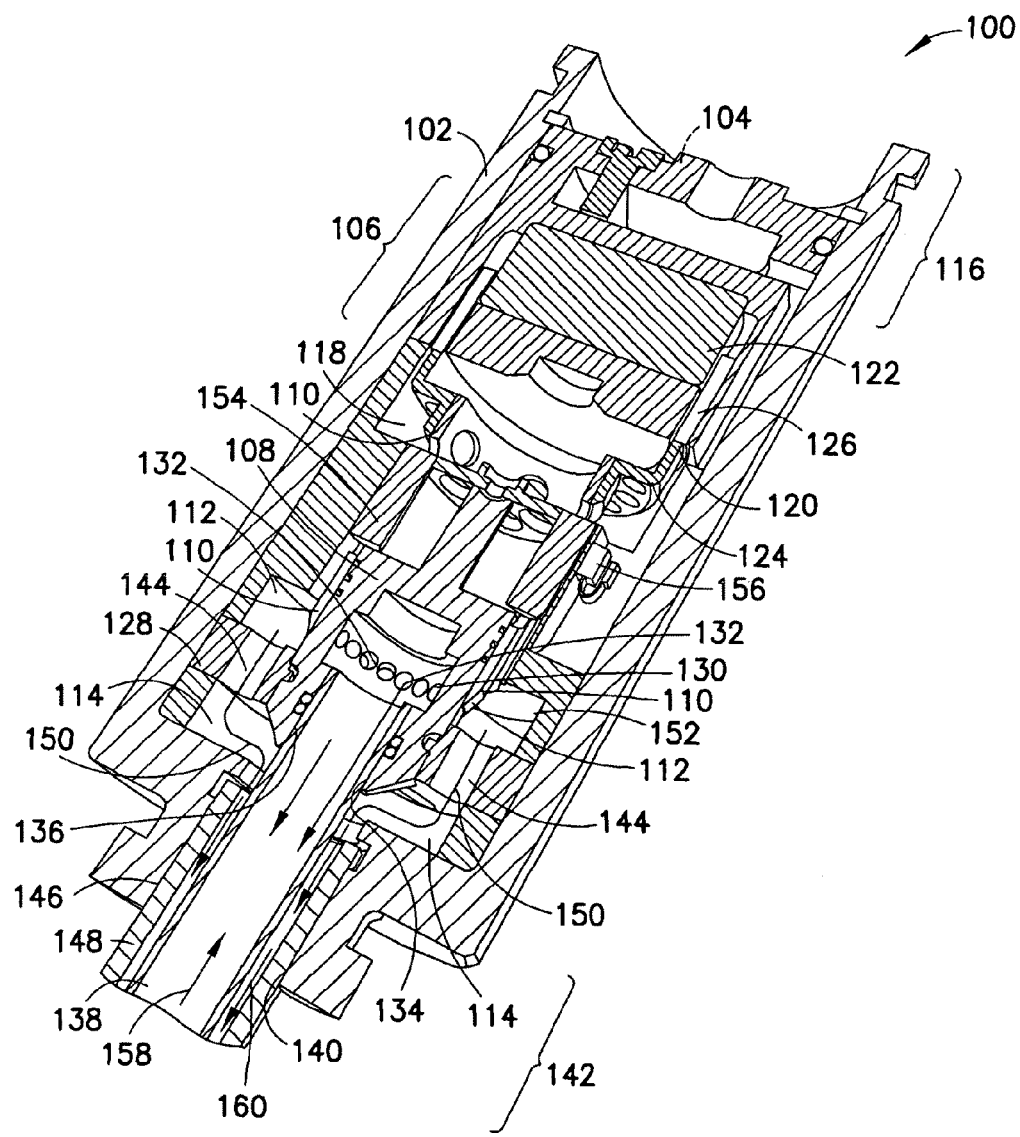
FIG. 3 is a section view of an exemplary valve used in the suspension system shown in FIG. 2.
Figure 4:
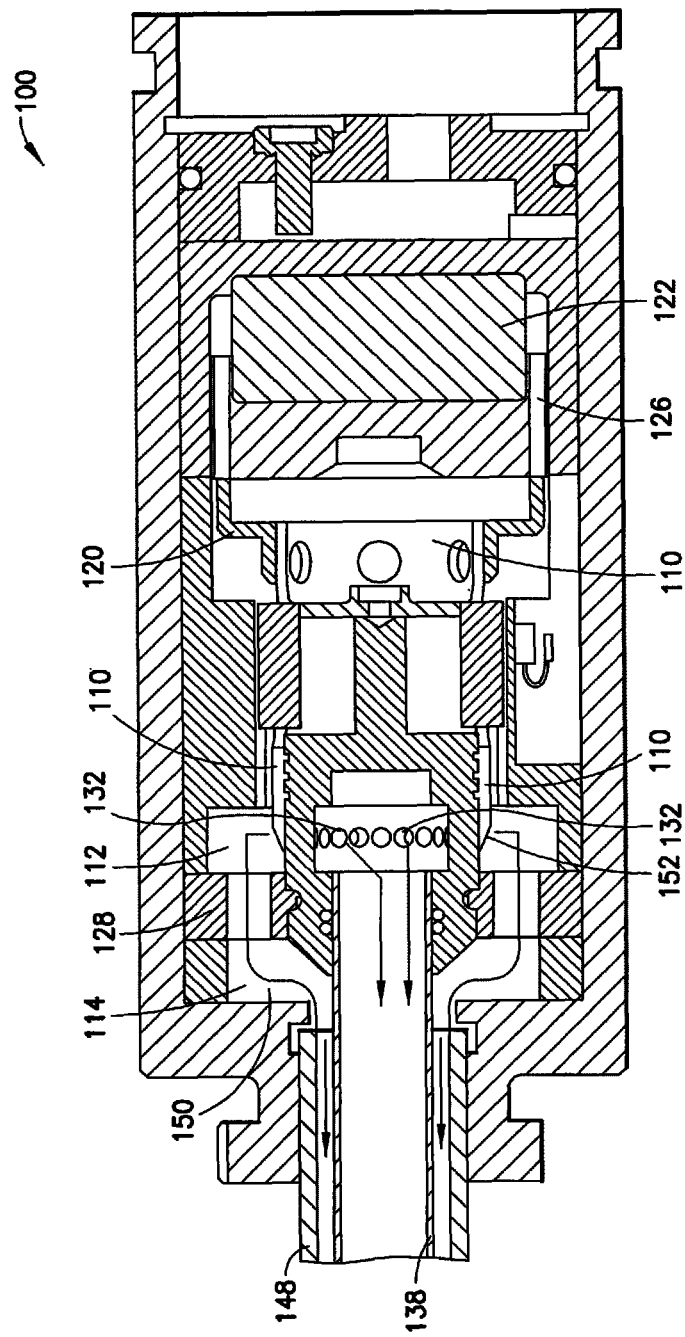
FIG. 4 is another section view of the exemplary valve shown in FIG. 3.
Figure 5:
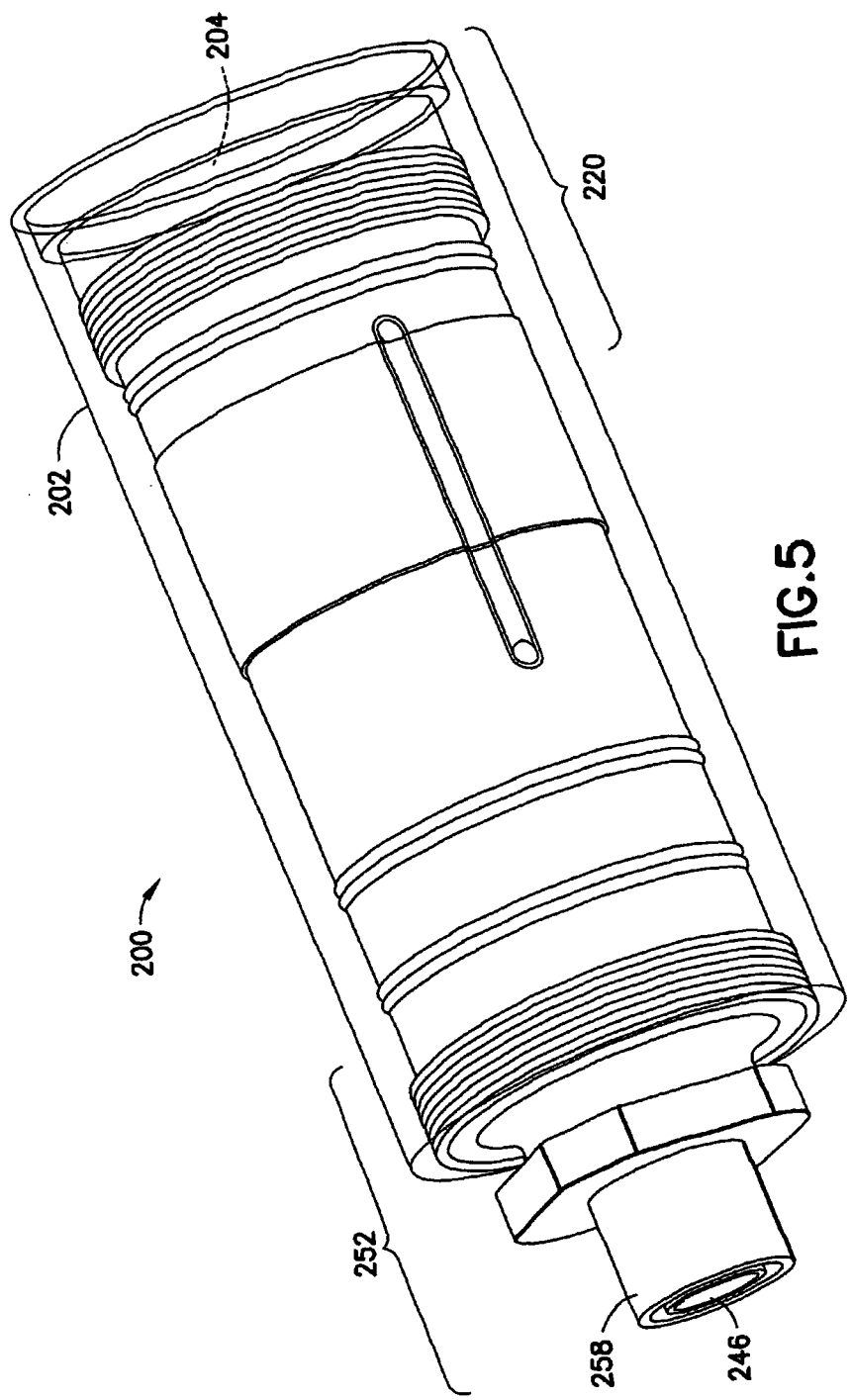
FIG. 5 is a perspective view of another exemplary valve used in the suspension system shown in FIG. 2.
Figure 6:
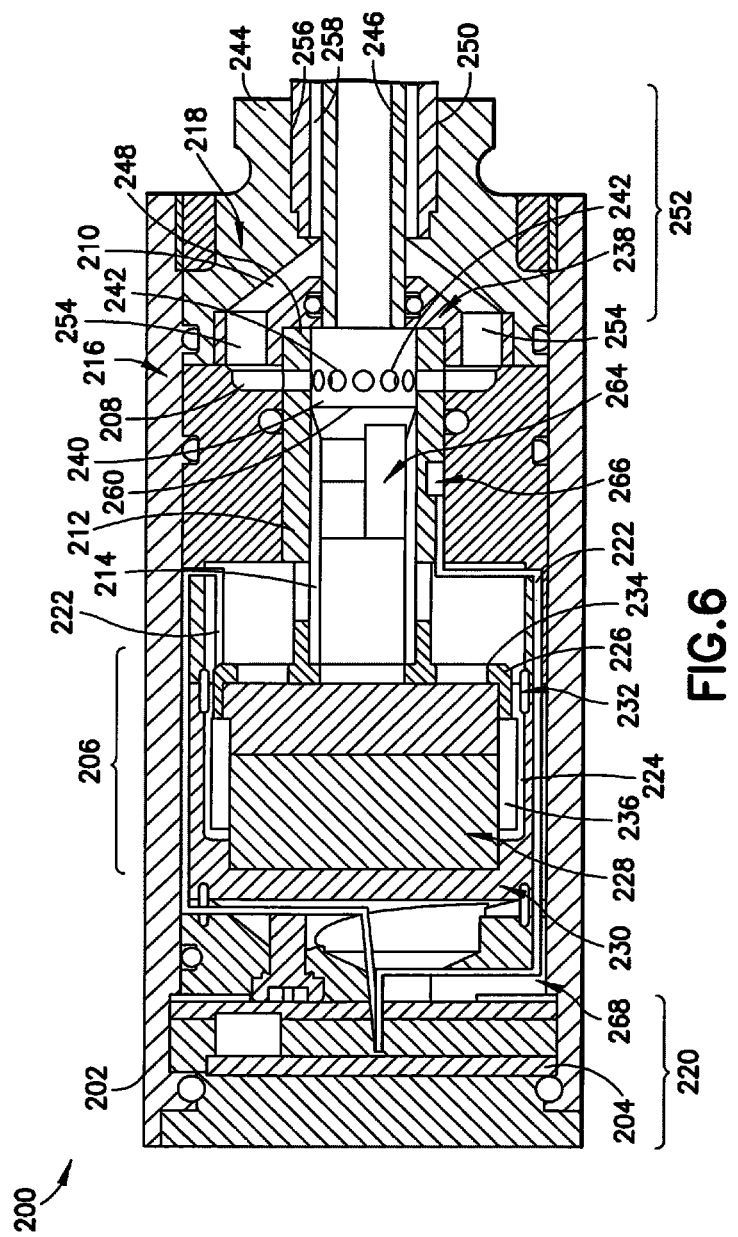
FIG. 6 is a section view of the exemplary valve shown in FIG. 5.
Figure 7:
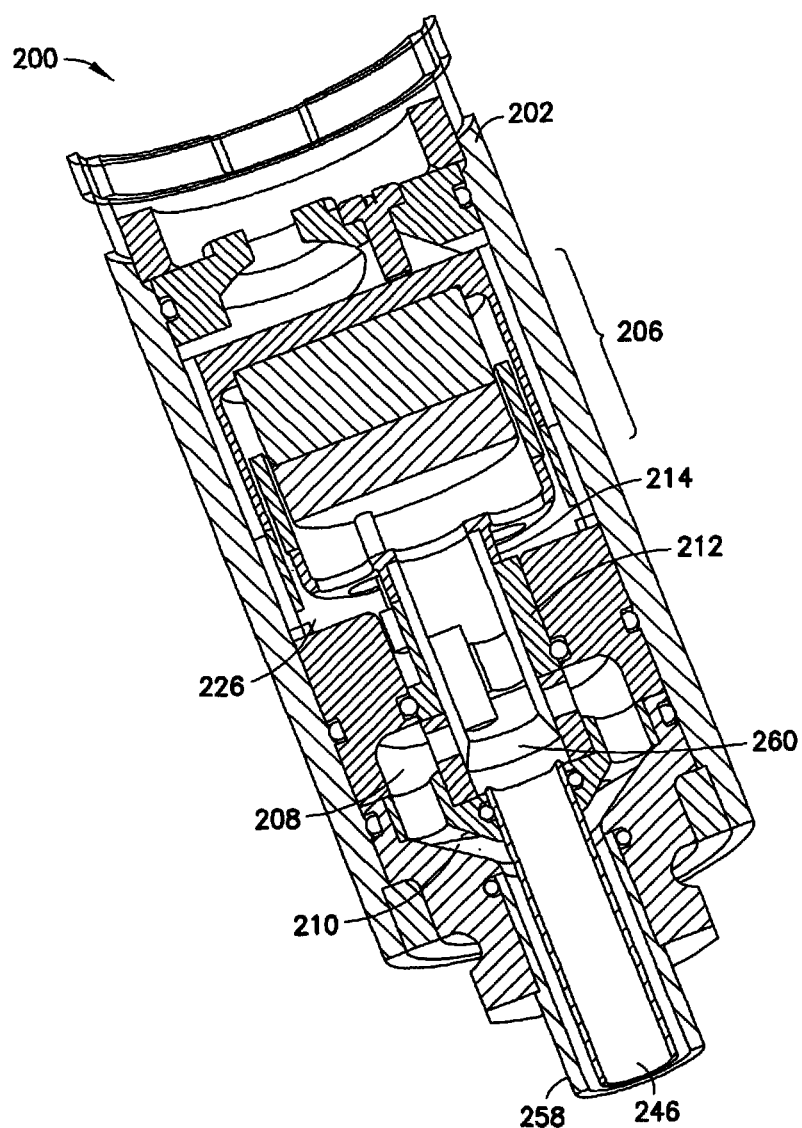
FIG. 7 is another section view of the exemplary valve shown in FIG. 5.
Figure 8:
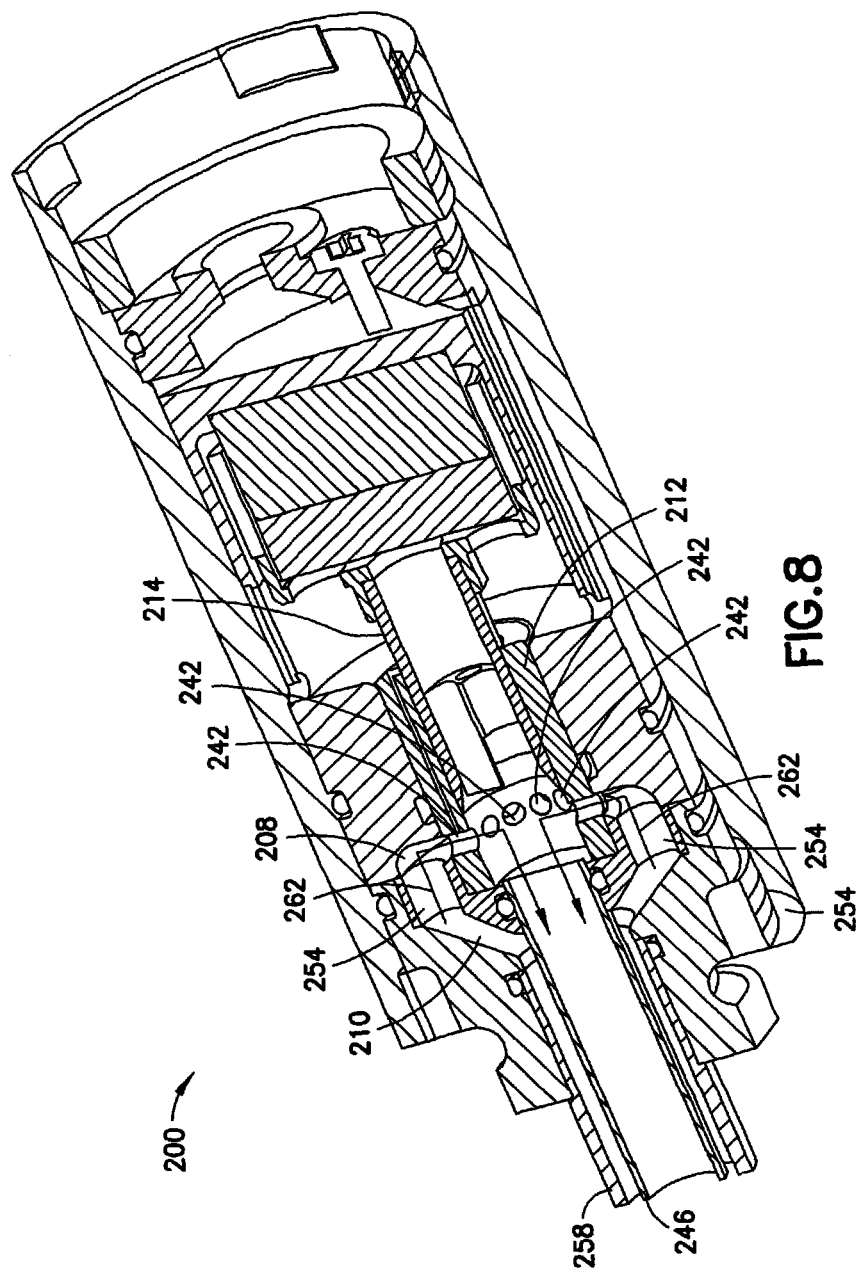
FIG. 8 is another section view of the exemplary valve shown in FIG. 5.
Figure 9:
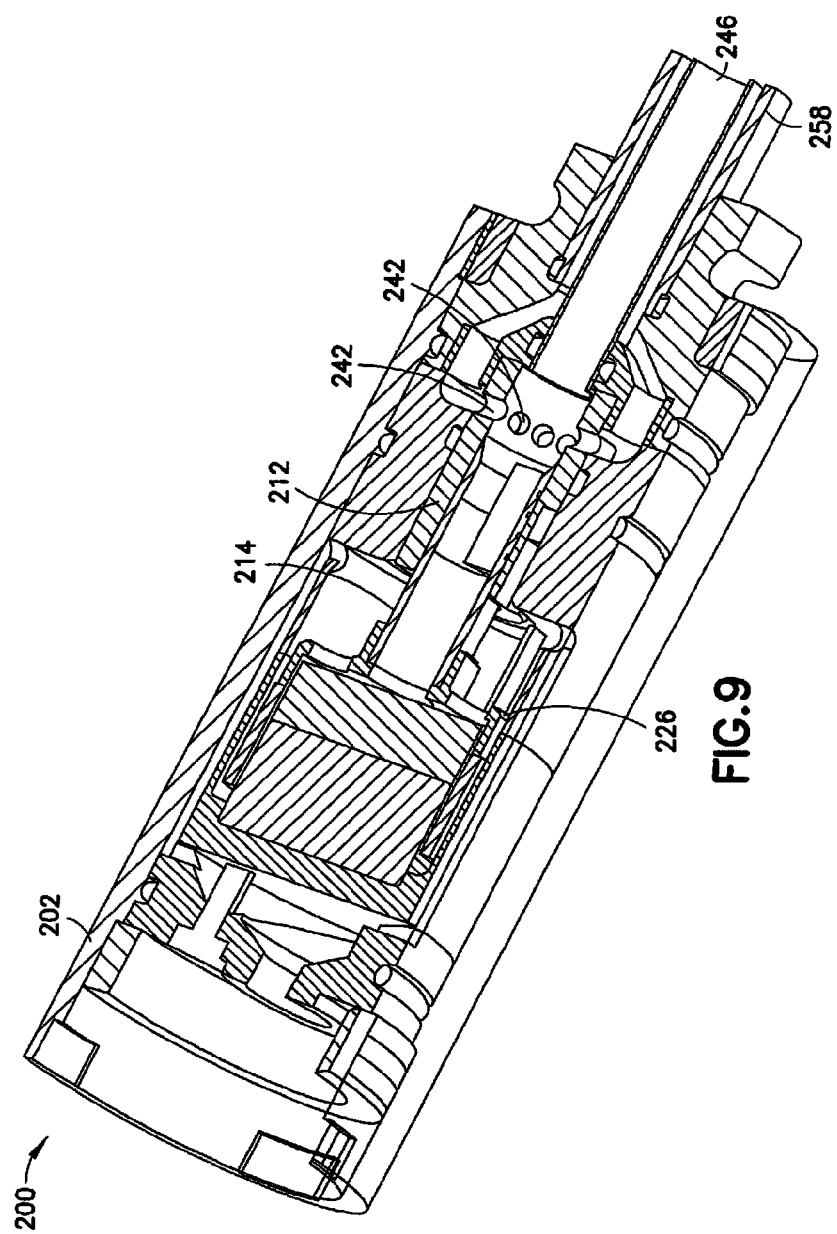
FIG. 9 is another section view of the exemplary valve shown in FIG. 5.
Figure 10:
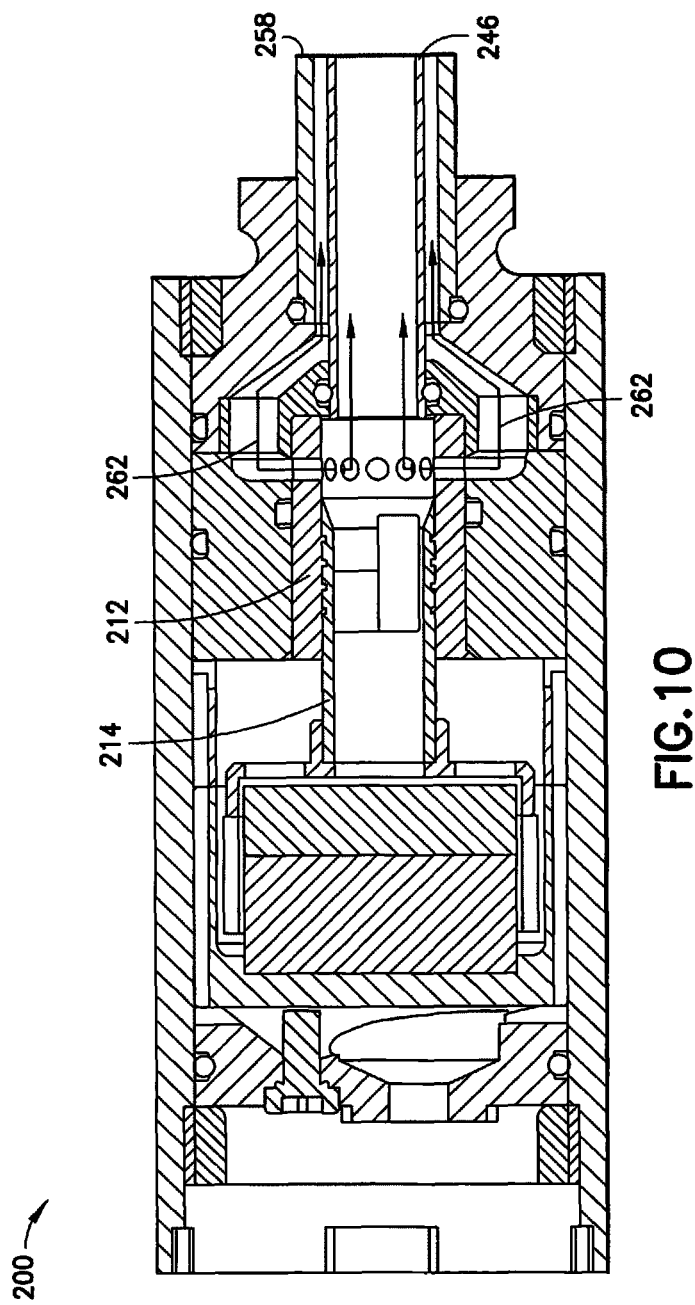
FIG. 10 is another section view of the exemplary valve shown in FIG. 5.
Figure 11:
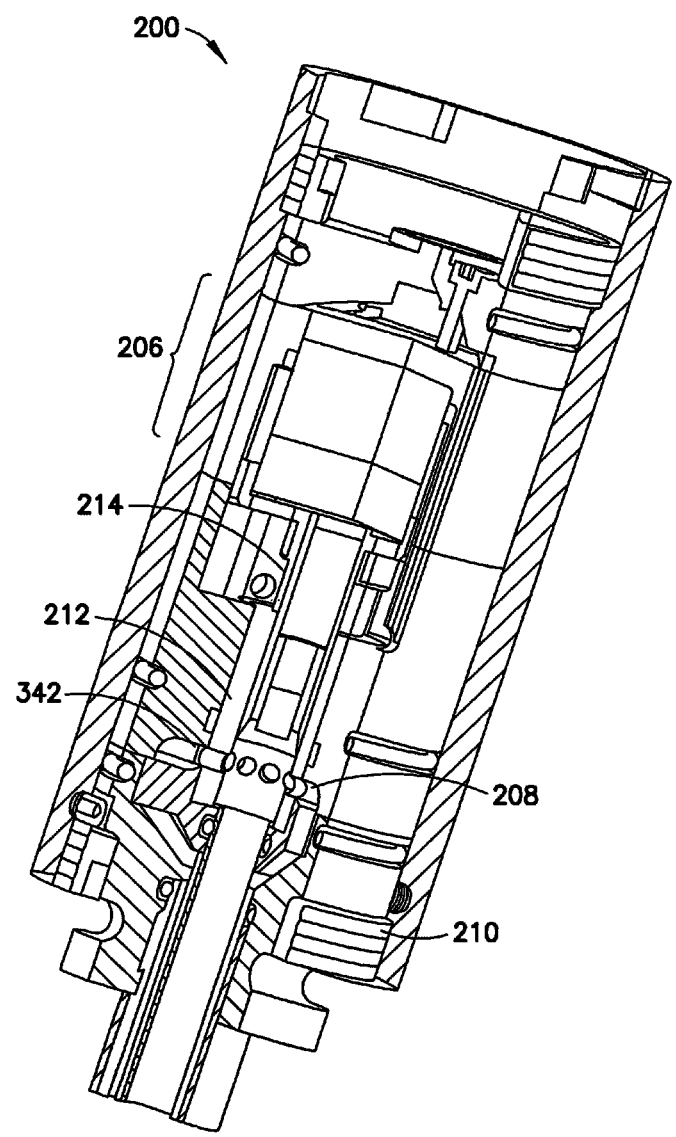
FIG. 11 is a three-quarters cut-away view of the exemplary valve shown in FIG. 5.

Referring now also to FIGS. 3 and 4, the EFCS 100 is illustrated. The EFCS 100 may be an electronically controlled valve such as an electro-mechanical hydraulic servo-valve for example. The controlled valve 100 includes a valve body 102, electronic circuitry 104, a valve actuator 106, a stationary post 108, an outer sleeve element 110, an upper chamber 112, and a lower chamber 114.

The electronic circuitry 104 (which may include a processor, microcomputer, or other electronics, for example) may be provided at a top end 116 of the valve body 102. The electronic circuitry 104 may be connected to the valve actuator 106 and other electronic components within the valve body 102.

The valve actuator 106 may be disposed within a cavity 118 of the valve body 102 proximate the top end 116. The valve actuator 106 may include a coil header assembly 120, and a magnetized element 122. The coil header assembly 106 includes a base portion 124 and a voice coil portion 126. The voice coil portion 126, which may comprise an electromagnetic armature, extends from the base portion 124. The voice coil 126 is movable relative to (and surrounds) the magnetized element 122. When the voice coil 126 is energized, interaction between the electromagnetic armature and the magnetic flux generated by the magnetized element 122 move the coil header assembly 120 to a desired location within the cavity 118.

The stationary post 108 is fixedly attached to a valve body base 128. The stationary post 108 comprises an inner bore 130 and a plurality of circumferentially spaced (or an annular array of) openings 132. The openings 132 extend from an inner surface of the stationary post to an outer surface of the stationary post and are in communication with the upper chamber 112 and the inner bore 130. An open end 134 of the inner bore 130 forms a conduit (or tube) receiving area 136. A tube 138 is connected to the receiving area 136. The tube 138 extends through an opening 140 at the bottom end 142 of the valve body 102 and is connected to the lower fluid chamber (or lower damper chamber) 56 (shown in FIG. 2).

The valve body base 128 is between the upper chamber 112 and the lower chamber 114 and comprises a plurality of holes 144 extending therethrough. The holes provide for fluid communication between the upper chamber 112 and the lower chamber 114.

The bottom end 142 of the valve body 102 comprises another conduit (or tube) receiving area 146. A tube 148 is connected to the receiving area 146. The tube 148 extends from the valve body 102 and is connected to the upper fluid chamber (or upper damper chamber) 54 (shown in FIG. 2). The tube (or outer tube) 148 surrounds the tube (or inner tube) 138. In other words, the inner tube 138 is inside the outer tube 148 with a gap therebetween. The gap between the tubes is provided as the outer tube 148 comprises a larger diameter than the inner tube 138. The gap allows for fluid flow between an outer surface of the inner tube and an inner surface of the outer tube as shown by arrows 150. Additionally, the lower chamber 114 is in fluid communication with the outer tube 148.

It should be noted that although the figures and description provide for the inner tube 138 to be connected to the bottom damper chamber 56 and the outer tube 148 to be connected to the upper damper chamber 54, any suitable configuration may be provided. For example, in an alternate embodiment, the inner tube may be connected to the upper damper chamber and the outer tube to be connected to the lower damper chamber.

The outer sleeve element, or valve control element, 110 is attached to the base portion 124 of the coil header assembly 120. An inner surface of the outer sleeve element is slidably engaged with an outer surface of the stationary post 108. As the coil header assembly 120 moves, an end portion 152 of the outer sleeve element 110 slides over the openings 132. The movement of the sleeve element 110 over the openings, or holes, 132 regulates the fluid flow between the inner tube 138 and the outer tube 148. Movement of the coil header assembly 120 towards the bottom end 142 of the valve body 102 covers the holes 132 and reduces or prevents fluid flow between the inner tube 138 and the upper chamber 112. The sleeve element 110 may also come into contact with the valve body base 128 (or a raised portion thereof) to form a tight pressure seal when the holes are covered. Movement of the coil header assembly 120 towards the top end 116 of the valve body 102 uncovers the holes 132 and provides or increases fluid flow between the inner tube 138 and the upper chamber 112. Exemplary fluid flows between the outer tube 148, the lower chamber 114, the upper chamber 112, the openings 132, and the inner tube 138 are illustrated by arrows 150.

The outer sleeve element 110 further comprises a magnetic element 154. The magnetic element 154 is proximate a position sensor 156 mounted in the valve body 102. The position sensor 156 is configured to sense the location of the magnetic element 154, and thus the location of the outer sleeve 110 relative to the openings 132.

During operation, the ASDS computer 42 calculates the required flow rate and sends it to the EFCS's high-speed microcomputer over the digital network interface 44 (see FIG. 2). A flow rate setting and aperture sensor feedback are processed in an advanced algorithm which operates a high efficiency power amplifier to drive the linear force motor (or valve actuator) 106. The magnetic element 122, which may be a high energy earth magnet (18 to 60 times more powerful than a typical ferrite magnet), for example, is held in a self-shielding magnetic flux guide which operates the free floating electromagnetic armature (or voice coil) 126. The armature operates a precision valve mechanism that proportionally controls the fluid aperture (or the openings) 132 with 1/100th of a millimeter accuracy. The moving parts may have a specialized surface treatment and are fit to about 300 micro-inch (about 0.008 millimeters) tolerance. For example, in a preferred embodiment, the moving parts may have a specialized surface treatment and are fit to between about 50 to about 100 micro-inch tolerance. The position sensor 156, which may be a high bandwidth sensor, measures the change in the aperture (or the location of the sleeve element 110 relative to the openings 132) through the hydraulic fluid without touching the moving parts.

During compression, hydraulic fluid flows up the inner path 138 of the damper stem (see arrow 158) from the bottom damper chamber 56 through the flow control aperture (or openings) 132 and down the outer path 148 of the damper stem into the upper chamber 54 (see arrow 160). During rebound the flow goes in the opposite direction. Under hard impact or quick rebound, tremendous pressures build inside the damper and EFCS body magazine (or valve body) 102. If the aperture 132 is opened wide such that the sleeve element 110 completely (or substantially) uncovers the openings 132 (more compliance and shock absorption), then fluid flows very quickly through the EFCS 100 and between the damper chambers 54, 56. The speed of the fluid across the internal surfaces converts kinetic energy (motion) into heat which may be dissipated through a heat wicking configuration of the EFCS 100 and damper body shells. This conversion of energy is what keeps riders from feeling excessive vibrations and impacts. By contrast, a rider may wish to have more "tactile terrain feedback" (road feel) and he/she would set preferences for higher stiffness which would let less fluid flow (wherein the sleeve element 110 covers a majority or substantial portion of the openings 132) and thus convert less kinetic energy into heat, but rather limit the fork travel and let some of the vibration and impact energy waves travel all the way up to the handlebars 14. However, unlike a standard/conventional suspension, unless the rider selects the system will sense when a very large impact is occurring and determine that maximum shock absorption is needed to improve rider safety and control, even if the rider has selected a stiffer, more tactile ride setting under regular conditions.

It is to be noted that in embodiments of the invention, the valve 100 may comprise various elements/components providing for features such as dead band reduction as disclosed in U.S. patent application Ser. No. 11/973,276, filed on Oct. 5, 2007, variable frequency and amplitude dither as disclosed in U.S. patent application Ser. No. 11/973,277, filed on Oct. 5, 2007, pressure equalization as disclosed in U.S. patent application Ser. No. 11/903,431, filed on Sep. 21, 2007, retaining elements as disclosed in U.S. patent application Ser. No. 11/903,132, filed on Sep. 19, 2007, control of a pressure regulator and cascaded control loops as disclosed in U.S. patent application Ser. No. 11/977,657 filed on Oct. 24, 2007, a circuit module and/or integrated electronics as disclosed in U.S. patent application Ser. No. 11/977,519 filed on Oct. 25, 2007, and/or closed loop current control of a voice coil using pulse width modulation drive elements as disclosed in U.S. patent application Ser. No. 11/977,471 filed on Oct. 25, 2007, which are all hereby incorporated by reference in their entireties.

Referring now also to FIGS. 5-11, a controlled valve (or EFCS) 200 according to another embodiment of the invention is illustrated. The controlled valve 200 is similar to the controlled valve 100.

The controlled valve includes a valve body 202, electronic circuitry 204, a valve actuator 206, an upper chamber 208, and a lower chamber 210. One difference between the controlled valve 200 and the controlled valve 100 is that the controlled valve 200 comprises a stationary sleeve 212 and a movable spool 214 (instead of a stationary post and a movable sleeve).

The valve body 202 may be a two piece member comprising an upper valve case 216 and a lower valve case 218. However, any suitable valve body configuration may be provided.

The electronic circuitry 204 may be provided at a top end 220 of the valve body similar to the controlled valve 100. The electronic circuitry 204 may be connected to the valve actuator 206 (by electrical wires 222) and other electronic components within the valve body.

The valve actuator 206 may be disposed within a cavity 224 of the valve body 202 proximate the top end 220. The valve actuator 206 may include a coil header assembly 226, and a magnetized element 228. The magnetized element 228 may also be attached to a motor housing 230. The motor housing 230 may be attached to the valve body 202 by assembly pins 232. However, any suitable attachment configuration may be provided. The coil header assembly 226 includes a base portion 234 and a voice coil portion 236. The voice coil portion 236, which may comprise an electromagnetic armature, extends from the base portion 234. The valve actuator 206 operates in a similar fashion as described above for the valve actuator 106 of the controlled valve 100.

The stationary sleeve 212 is fixedly attached to a valve body base 238. The stationary sleeve 212 comprises an inner bore 240 and a plurality of circumferentially spaced (or an annular array of) openings 242. The openings 242 extend from an inner surface of the stationary sleeve 212 to an outer surface of the stationary sleeve 212 and are in communication with the upper chamber 208 and the inner bore 240. A portion of the valve body base 238 forms a conduit (or tube) receiving area 244. A tube 246 is connected to the receiving area 244. An open end 248 of the inner bore is connected to the tube 246 at the valve body base 238. The tube 246 extends through an opening 250 at the bottom end 252 of the valve body 202 and is connected to the lower fluid chamber (or lower damper chamber) 56.

Similar to the controlled valve 100, the valve body base 238 is between the upper chamber 208 and the lower chamber 210 and comprises a plurality of holes 254 extending therethrough. The holes 254 provide for fluid communication between the upper chamber 208 and the lower chamber 210.

Similar to the controlled valve 100, the bottom end 252 of the valve body 202 comprises another conduit (or tube) receiving area 256. A tube 258 is connected to the receiving area 256. The tube 258 extends from the valve body 202 and is connected to the upper fluid chamber (or upper damper chamber) 54. The tube (or outer tube) 258 surrounds the tube (or inner tube) 246.

The movable spool, or valve control element, 214 is attached to the base portion 234 of the coil header assembly 226. An outer surface of the movable spool 214 is slidably engaged with an inner surface (or inner bore) 240 of the stationary sleeve 212. As the coil header assembly 226 moves, an end portion 260 of the spool 212 slides over the openings 254. The movement of the spool 212 over the openings, or holes, 254 regulates the fluid flow between the inner tube 246 and the outer tube 258. Movement of the coil header assembly 226 towards the bottom end 252 of the valve body 202 covers the holes 242 and reduces or prevents fluid flow between the inner tube 246 and the upper chamber 208. The spool 212 may also come into contact with the valve body base 238 (or a raised portion thereof) to form a tight pressure seal when the holes are covered. Movement of the coil header assembly 226 towards the top end 220 of the valve body 202 uncovers the holes 254 and provides or increases fluid flow between the inner tube 246 and the upper chamber 208. Exemplary fluid flows (best shown in FIG. 8) between the outer tube 258, the lower chamber 210, the upper chamber 208, the openings 242, and the inner tube 246 are illustrated by arrows 262.

The spool 214 further comprises a magnetic element (or sensor magnet) 264. The magnetic element 264 is proximate a position sensor 266 mounted on the outer surface of the sleeve 212. The position sensor 266 may be connected to the electronic circuitry by a printed circuit board (A/S PCB) 268. However, any suitable connection may be provided. The position sensor 266 is configured to sense the location of the magnetic element 264, and thus the location of the spool 214 relative to the openings 242.

During operation of the ASDS, the movement of the spool 214 over the openings 242 provides a precision valve mechanism that proportionally controls fluid flow. The controlled valve operates within the ASDS in a similar fashion as described above for controlled valve 100.

Figure 12:
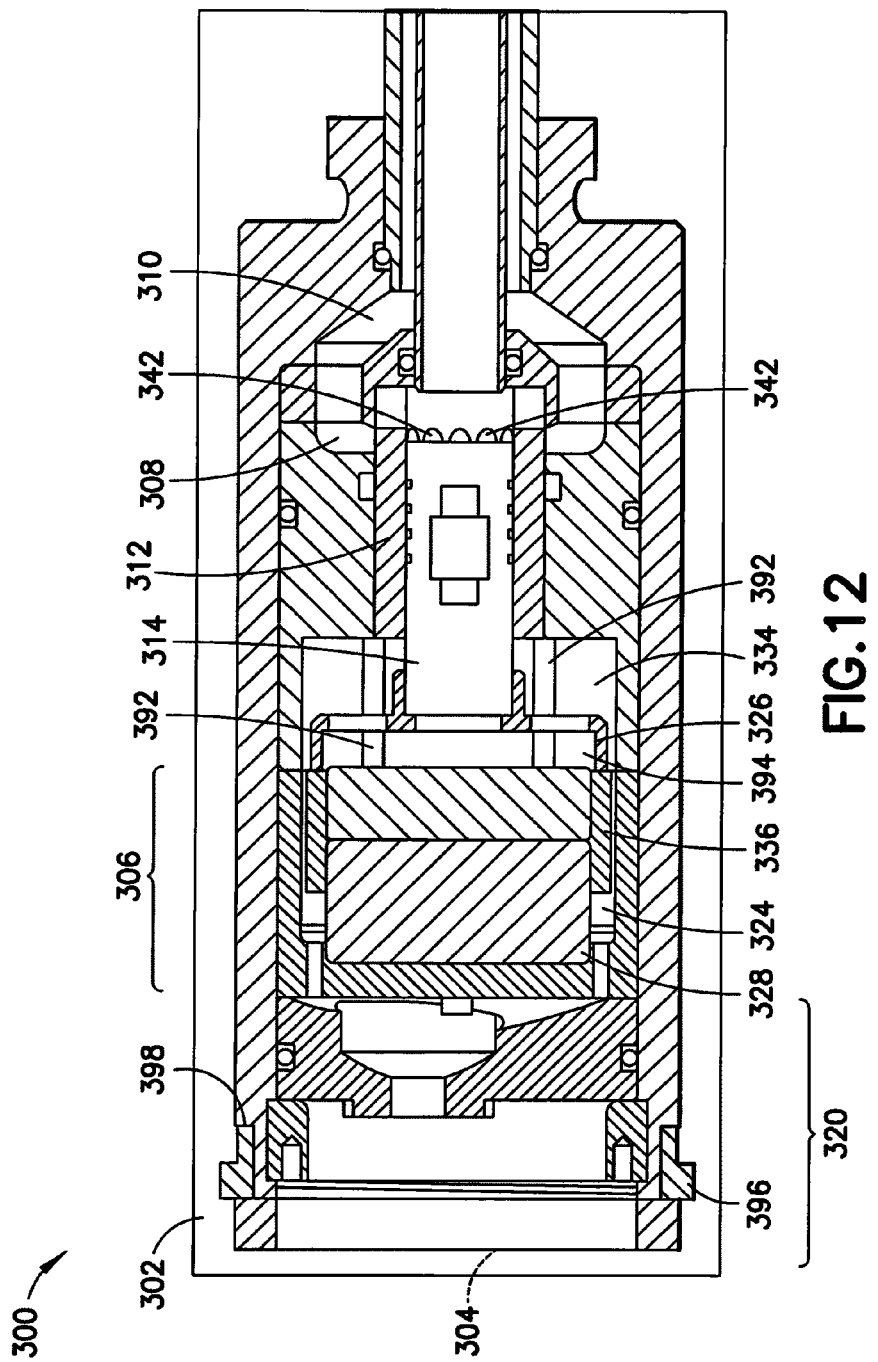
FIG. 12 is a section view of another exemplary valve used in the suspension system shown in FIG. 2.

Referring now also to FIG. 12, a controlled valve (or EFCS) 300 according to another embodiment of the invention is illustrated. The controlled valve 300 is similar to the controlled valve 200.

The controlled valve 300 includes a valve body 302, electronic circuitry 304, a valve actuator 306, a stationary sleeve 312, a movable spool 214, an upper chamber 308, and a lower chamber 310. One difference between the controlled valve 300 and the controlled valve 200 is that the controlled valve 300 comprises a uni-body case 302.

The electronic circuitry 304 may be provided at a top end 320 of the valve body 302 similar to the controlled valve 200. The electronic circuitry 304 may be connected to the valve actuator 306 and other electronic components within the valve body 302. Additionally, the controlled valve 300 may comprise a lock ring 398 and a split locating ring 396 proximate the top end 320 of the valve body 302.

The valve actuator 306 may be disposed within a cavity 324 of the valve body 302 proximate the top end 320. The valve actuator 306 may include a coil header assembly 326, a coil/former 394 and a magnetized element 328. The coil header assembly 326 includes a base portion 334 and a voice coil portion 336. The voice coil portion 336, which may comprise an electromagnetic armature, extends from the base portion 334. The valve body 302 may also comprise guide pins 392 aligned with portions of the coil header assembly 326 to provide an anti-rotation feature. The valve actuator 306 operates in a similar fashion as described above for the valve actuator 206 of the controlled valve 200.

The stationary sleeve 312, the movable spool 314, the upper chamber 308, and the lower chamber 310 are configured similar to that of the controlled valve 200.

During operation of the ASDS, the movement of the spool 314 over the openings 342 provides a precision valve mechanism that proportionally controls fluid flow. The controlled valve 300 operates within the ASDS in a similar fashion as described above for controlled valves 100, 200.

Figure 13:
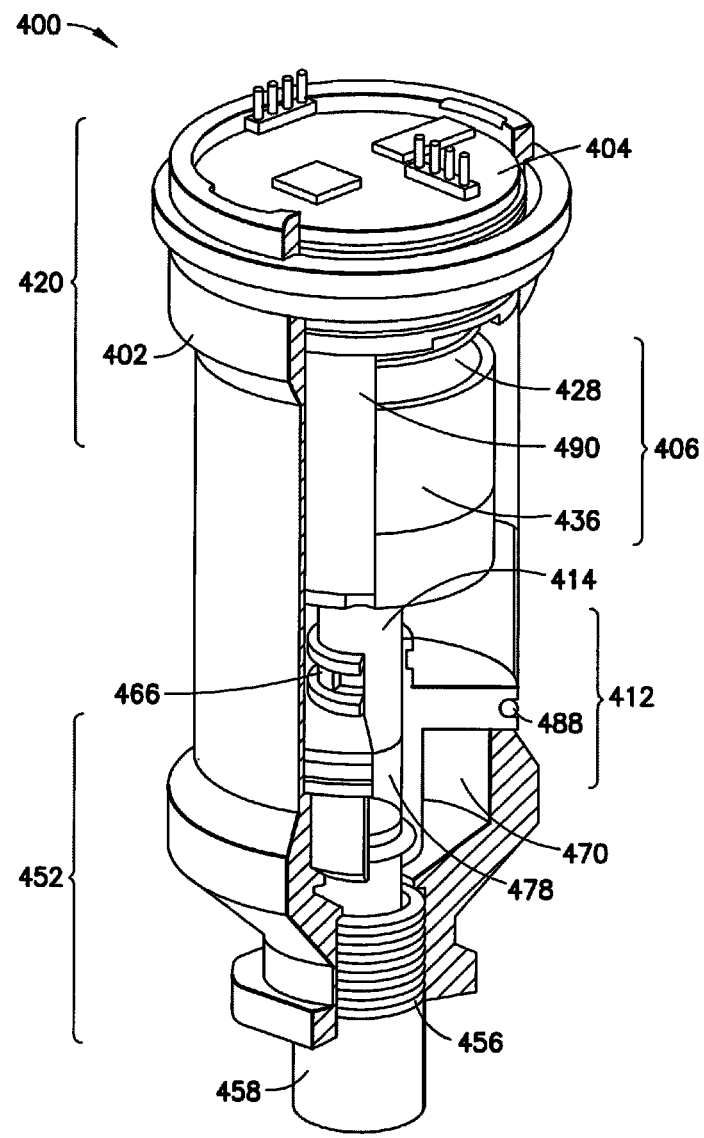
FIG. 13 is a partial section view of another exemplary valve used in the suspension system shown in FIG. 2.
Figure 14:
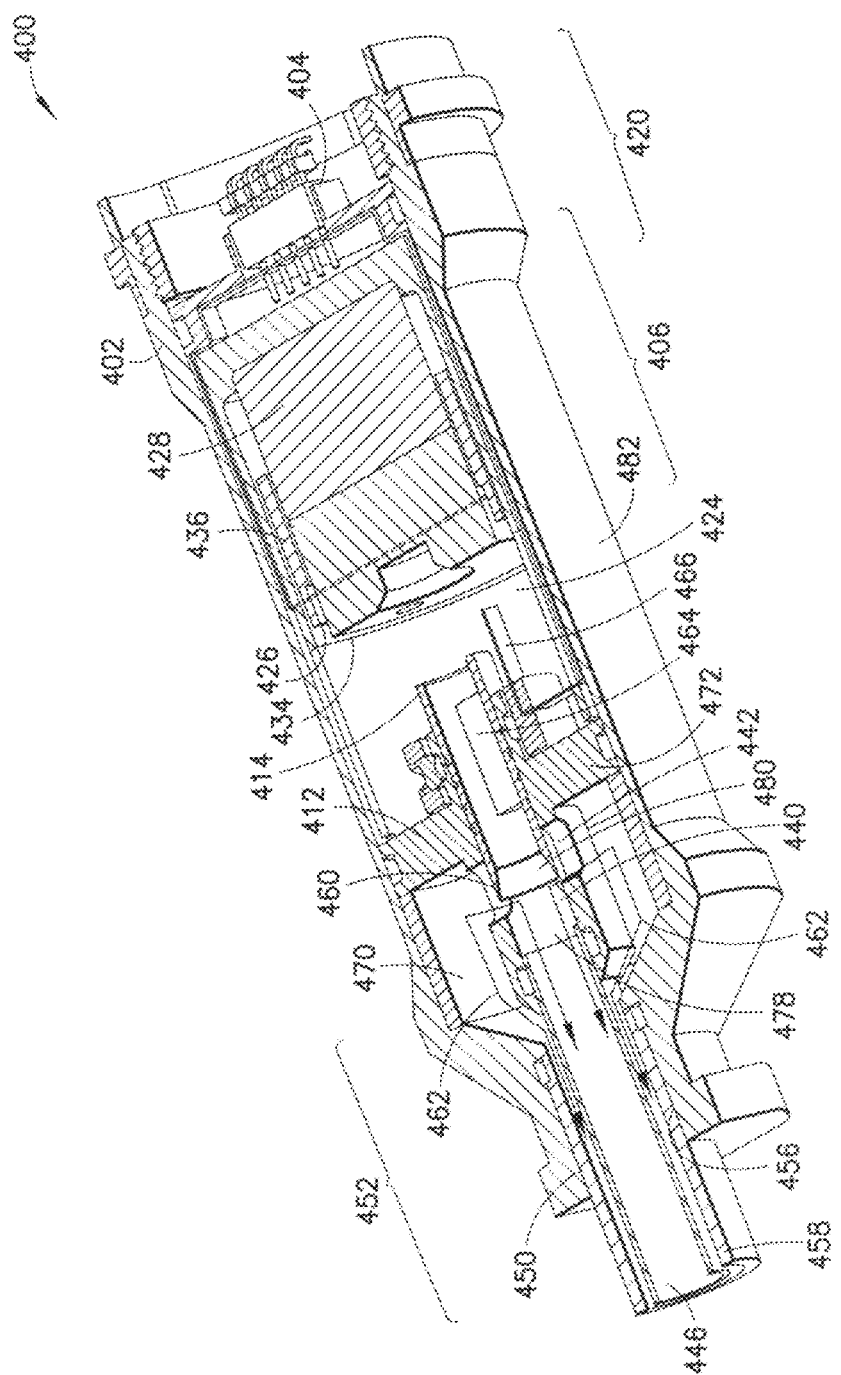
FIG. 14 is a section view of the exemplary valve shown in FIG. 13.

Referring now also to FIGS. 13 and 14, a controlled valve (or EFCS) 400 according to another embodiment of the invention is illustrated. The controlled valve is similar to the controlled valves 200, 300.

The controlled valve 400 includes a valve body 402, electronic circuitry 404, a valve actuator 406, a stationary sleeve 412, and a movable spool 414.

The valve body (or body magazine) 402 may comprise a uni-body case or be a two piece member comprising an upper valve case and a lower valve case. However, any suitable valve body configuration may be provided. The valve body 402 may be fabricated from aircraft aluminum alloy for example. However, any suitable material may be provided. In one embodiment, the valve body 402 configuration may withstand internal fluid pressures of 750 psi (50 bar) and tensile loads of 1,000 lbs-force (4,450 N). The valve body 402 comprises a cavity 424 for housing components therein.

The electronic circuitry 404 may be provided at a top end 420 of the valve body 402 similar to the controlled valves 200, 300. The electronic circuitry 404 may be connected to the valve actuator 406 and other electronic components within the valve body 402. In one embodiment, the electronic circuitry 404 may include a high speed microcomputer having a digital network interface and further comprising a control algorithm, a high efficiency power amplifier, and/or self diagnostics. However, any suitable configuration may be provided.

Figure 15:
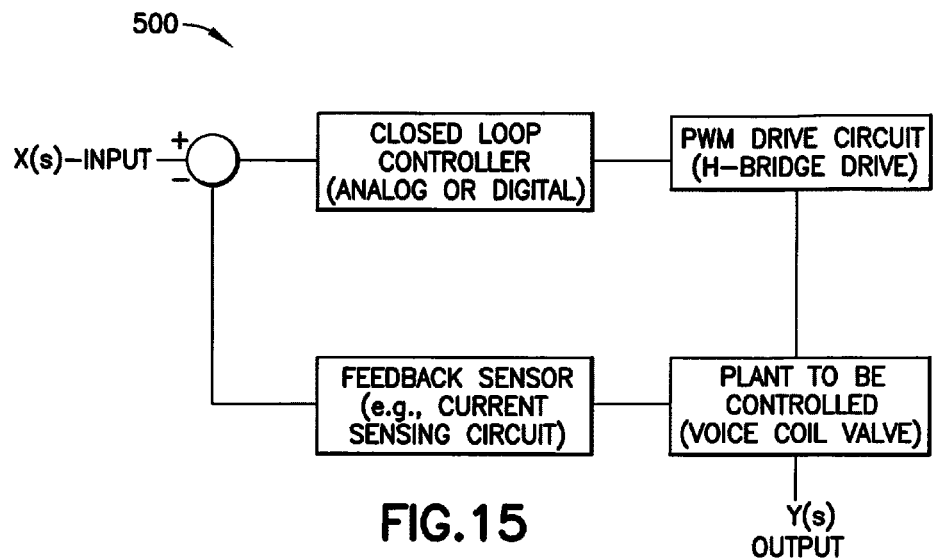
FIG. 15 is a block diagram of an exemplary control system used in the exemplary valve shown in FIG. 13.
Figure 16:
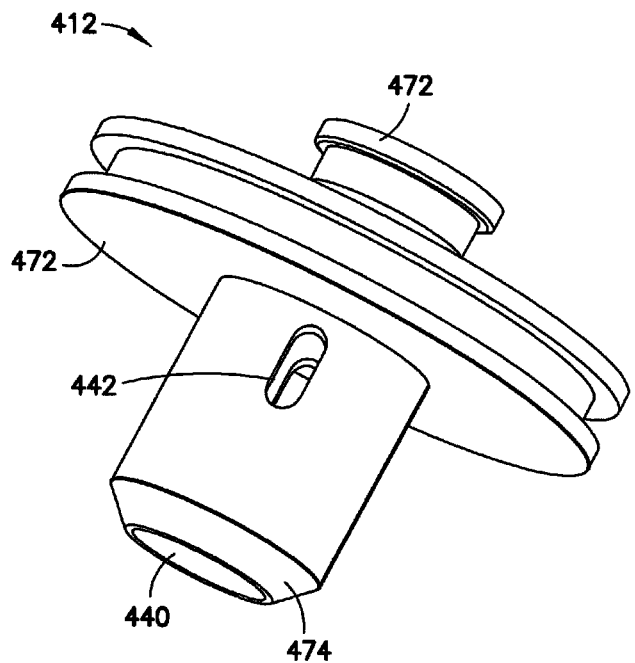
FIG. 16 is a perspective view of an exemplary sleeve used in the exemplary valve shown in FIG. 13.
Figure 19:
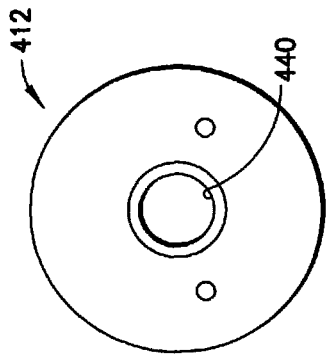
FIG. 19 is a bottom view of the exemplary sleeve shown in FIG. 16.
Figure 18:
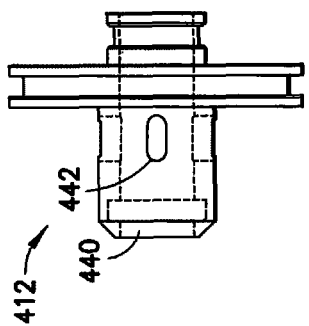
FIG. 18 is a side view of the exemplary sleeve shown in FIG. 16.
Figure 20:
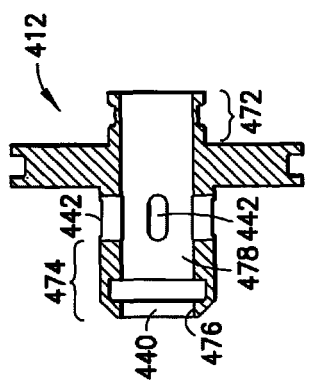
FIG. 20 is a section view of the exemplary sleeve taken along the line 20-20 shown in FIG. 17.
Figure 17:
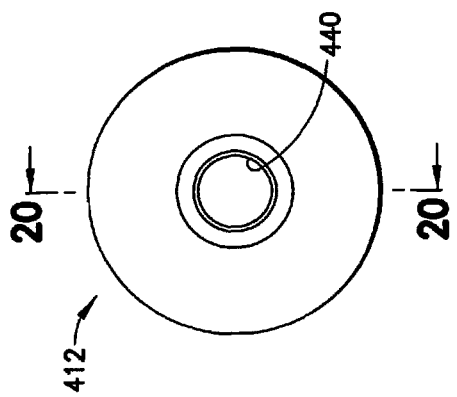
FIG. 17 is a top view of the exemplary sleeve shown in FIG. 16.

The electronic circuitry, or integrated electronics, 404 may further comprise optional power regulation, a controller (analog or digital), an actuator amplifier (preferably Pulse-Width-Modulation (PWM)), and sensing circuitry (in this case, spool position sensing and optional current sensing; actuator velocity sensing, acceleration sensing, upstream and/or downstream pressure sensors, differential pressure sensors, and/or flow sensors may also be incorporated). Shown in FIG. 15 is a basic block diagram of an exemplary system 500 as described above.

The electronics assembly 404 may connect via a header/receptacle assembly that is further mounted to a flexible printed circuit, for example. The receptacle and FPC (flexible printed circuit) may also be potted in place.

The electronics assembly 404 may perform various functions including: receiving primary high voltage power (typically 14.4V) and 5V logic supply power, receiving and providing to a master communication device digital information for valve position requests, diagnostic information, and status information over a digital communication network (I2C although analog and other digital protocols are possible), monitoring sensory input from the valve mechanical and electrical elements, performing mathematical algorithms to determine the power amplifier command signals (Pulse-Width-Modulation [PWM] and Direction [DIR]); these signals may be communicated to the power amplifier device.

The power amplifier may be an Allegro A3959 or equivalent, for example, and accepts PWM and DIR commands from the microprocessor and drives the voice coil. The drive amplifier may also have internal protection circuitry. The power applied to the coil generates a current through the coil that interacts with the static magnetic field the produce a force proportional to the current. The current is monitored in series with the coil via specialized circuitry and provided to the pC (microprocessor) for monitoring, analysis, and diagnostic/protection functions. Coil current and valve position sensor signals/power are passed via the pin header connecter at the top of the valve.

The valve actuator 406, which may be a linear force motor for example, may be disposed within the cavity 424 of the valve body 402 proximate the top end 420. The valve actuator 406 may include a coil header assembly 426, and a magnetized element 428. The magnetized element 428 may be a high energy rare earth magnet, such as typically NdFeB for example. However, any suitable magnetized element may be provided. The coil header assembly 426 includes a base portion 434 and a voice coil portion 436. The voice coil portion 436, which may comprise an electromagnetic armature, extends from the base portion 434. Additionally, the valve actuator may comprise a self-shielding magnetic flux guide 490.

It should be noted that the valve actuator, or valve actuator assembly, 406 may comprise any suitable configuration such as a voice coil, a solenoid, or a rotary motor, for example. Additionally, it should be noted that the valve actuator assembly 406 may be an indirectly actuated configuration such as a pilot or magnetic attraction/repulsion configuration, for example. However, any suitable type configuration may be provided. Further, the valve body 402 (and cavity 424) may be filled with fluid, such as hydraulic fluid for example, wherein the valve actuator (or valve actuator assembly) 406 may be a wetted actuator assembly.

The valve actuator 406 operates in a similar fashion as described above for the valve actuator 206, 306 of the controlled valve 200, 300. Current passes through the coil and interacts with the static magnetic field established by the magnetic flux conduit, the magnet, and a pole. The flux conduit and pole may be magnetically permeable with high field saturation (e.g., steel or iron). The force created may be expressed by the following:

$$F_{Coil}=K_m I$$

The stationary sleeve 412 (further illustrated in FIGS. 16-20) is fixedly attached to the valve body 402. The sleeve 412, which may be a one-piece member for example, may be attached to the valve body 402 by a press-fit configuration. Additionally, an o-ring 488 or other sealing type member may be provided between the sleeve 412 and the valve body 402. The sleeve 412 is disposed within the valve body 402 between the cavity 424 and an outer valve chamber 470.

The stationary sleeve 412 comprises a flange member 472, an inner bore 440, and a plurality of circumferentially spaced (or an annular array of) openings 442. The flange member 472 comprises a substantially circular shape and forms a boundary between the cavity 424 and the outer valve chamber 470. The inner bore 440 extends from a top end 472 of the sleeve to a bottom 474 end of the sleeve. The openings 442 may be slots or slotted holes as shown in the figures. It should be noted that the openings 442 may comprise other shapes such as, circular, slotted, square, rectangular, or triangular, for example. However, any suitable opening shape may be provided. The openings 442 extend from an inner surface (or inner bore 440) of the stationary sleeve to an outer surface of the stationary sleeve 412 and are in communication with the outer valve chamber 470 and the inner bore 440. The openings 442 are substantially perpendicular to the inner bore 440. A portion 476 of the inner bore 440 proximate the bottom end 474 of the sleeve forms a conduit (or tube) receiving area. A tube 446 is connected to the receiving area 476. The tube 446 extends through an opening 450 at the bottom end 452 of the valve body 402 and is connected to the lower fluid chamber (or lower damper chamber) 56. Additionally, a portion of the inner bore 440 proximate the bottom end 474 and the openings 442 forms an inner valve chamber 478. The inner valve chamber 478 is surrounded by the outer valve chamber 470 with the bottom end 474 of the sleeve 412 therebetween. This configuration provides for the inner chamber 478 and the outer chamber 470 to be in fluid communication through the openings 442.

Figure 34:
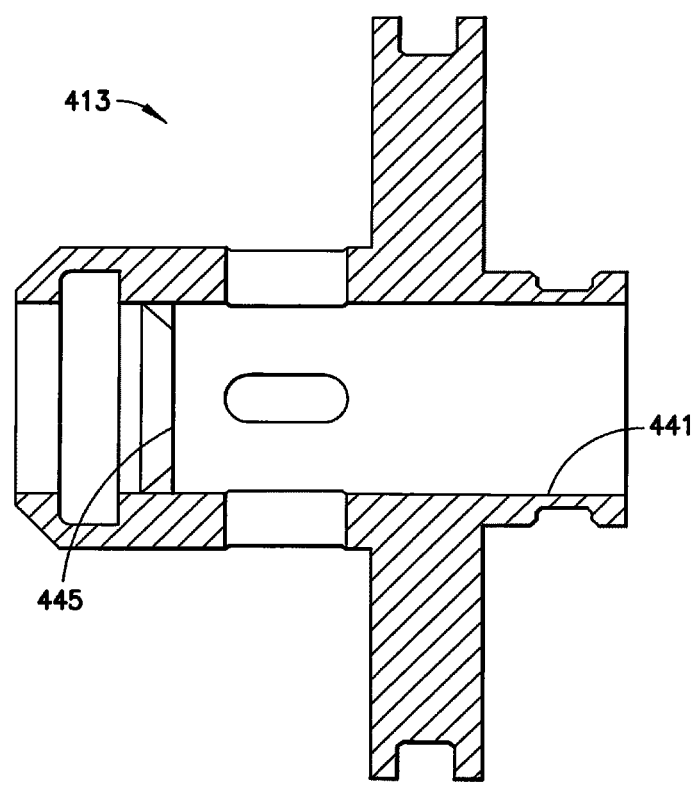
FIG. 34 is a section view of another exemplary sleeve used in the exemplary valve shown in FIG. 13.

Referring now also to FIG. 34, a stationary sleeve 413 in accordance with another embodiment is illustrated. The sleeve 413 is similar to the sleeve 412, however, the sleeve 413 further comprises a raised surface 445 within the inner bore 441 configured to allow for contact with the end of the movable spool 414. This contact between the raised surface 445 and the spool 414 provides for a tight pressure seal when the holes 442 are covered. The raised surface may have a diameter that is smaller than the diameter of the inner bore 441. The raised surface, or seat ledge, 445 may be integral with the sleeve or may be a separate member (which may comprise an elastomer material for example) attached to the inner bore 441.

Similar to the controlled valve 200, 300, the bottom end 452 of the valve body 402 comprises another conduit (or tube) receiving area 456. A tube 458 is connected to the receiving area 456 such that the tube 458 is in fluid communication with the outer chamber 470. The tube 458 extends from the valve body 402 and is connected to the upper fluid chamber (or upper damper chamber) 54. The tube (or outer tube) 458 surrounds the tube (or inner tube) 446. The tubes 446, 458 form at least a portion of a damper stem.

The movable spool, or valve control element, 414 is attached to the base portion 434 of the coil header assembly 426. An outer surface of the movable spool 414 is slidably engaged (or connected) with an inner surface (or inner bore) 440 of the stationary sleeve 412. As the coil header assembly 426 moves, an end portion 460 of the spool 414 slides over the openings 442. The end portion 460 may comprise narrowing profile shape 480. For example, the narrowing profile shape 480 may comprise a chamfer or a blend for example. However, any suitable configuration or narrowing shape may be provided. The movement of the spool 414 over the openings, or holes, 442 (see FIGS. 21-23) regulates the fluid flow between the inner tube 446 and the outer tube 458 (and between the inner chamber 478 and the outer chamber 470). Movement of the coil header assembly 426 towards the bottom end 452 of the valve body 402 covers the holes 442 and reduces or prevents fluid flow between the inner tube 446 and the outer chamber 470 (see FIG. 21 illustrating a closed or substantially closed position). Movement of the coil header assembly 426 towards the top end 420 of the valve body 402 uncovers the holes 442 and provides or increases fluid flow between the inner tube 446 and the outer chamber 470 (see FIG. 22 illustrating an open or substantially open position). Exemplary fluid flows between the outer tube, the outer chamber, the inner chamber, the openings, and the inner tube are illustrated by arrows 462. Additionally, with reference to FIG. 2, arrow 160 illustrates an outer fluid path (to or from the top damper chamber 54). For example, arrow 158 illustrates an inner fluid path (to or from the bottom damper chamber 56).

The movement of the spool 414 over the openings, or holes, 442 forms a precision valve mechanism wherein the openings 442 act as a proportional fluid control aperture which may be accurate to within 400 micro-inches (0.0004 inches, 1/100th of a millimeter). Additionally, the moving parts (for example the movable spool) have a specialized surface treatment and may fit to a tolerance of 200 micro-inches. It should be noted that although the figures illustrate four circumferentially oriented slotted openings, any number or configuration of openings may be provided.

The spool 414, which may be a one piece member for example, further comprises a magnetic element (or sensor magnet) 464. The magnetic element 464 may be attached to the spool 414 in any suitable fashion. The magnetic element 464 is proximate a position sensor 466 mounted to the sleeve 412 proximate the top end 472. The position sensor 466 may be connected to the electronic circuitry 404 by sensor wiring 482, for example. However, any suitable connection may be provided. The position sensor 466 is configured to sense the location of the magnetic element 464, and thus the location of the spool 414 relative to the openings 442. The position sensor 466 may be a high bandwidth sensor with a non-contact configuration which senses through hydraulic fluid.

The position sensor 466 may be mounted to the externals (or outer surface) of the sleeve 412 and senses the position of the sensing magnet 464 which may be rigidly affixed to the moving element spool 414. The coil moves freely within the magnetic housing and is directly coupled to the spool. Due to proper sensor and magnet selection and geometry, the sensor output is nearly linear with respect to spool position and can be used to represent the spool position accurately.

The sensor 466 may be configured to sense a location of the spool relative to the sleeve by contact or non-contact sensing techniques. For example, the sensor may comprise a contact potentiometer. In another example, the sensor may comprise hall effect/magnet, optical, or capacitive type sensors. Additionally, the sensing magnet, or sensing element, 464 (which may be hall, optical pick-up, or potentiometer, for example) may be mounted to either stationary portions in the valve (such as the sleeve for example), or the movable portions in the valve (such as the spool for example).

During operation of the ASDS, the movement of the spool 414 over the openings 442 provides a precision valve mechanism that proportionally controls fluid flow. The controlled valve 400 operates within the ASDS in a similar fashion as described above for controlled valve 100, 200, 300.

As the spool 414 moves, it covers (extends) or uncovers (retracts) an annular ring of holes or slots 442 to increase the area available for fluid flow. Fluid flows up into the valve from the internal flow tube 446, collects in the inner valve fluid chamber 478, through the holes or slots 442 into the outer valve chamber 470, and down through the outer flow tube 458 but outside of the inner flow tube 446.

The central processor accepts valve position commands over the digital network link, commands the power amplifier (in the electronics section) and coil (e.g., voice coil) to apply forces of proper magnitude and polarity, to position the spool by extending or retracting, which repositions the spool and rigidly affixed sense magnet with respect to the sensor, which controls the flow opening. It is noted that in one embodiment, the rigidly affixed sensor magnet is made as a second (inner) portion that is positioned within and attached to the outer spool (which has the chamfer and controls fluid flow through the slots). See FIG. 21 for instance. Additionally it should be noted that the polarity of the magnetic members within the valve may be selected such the valve fails in a fully open or fully closed configuration depending on the requirement.

Figure 24:
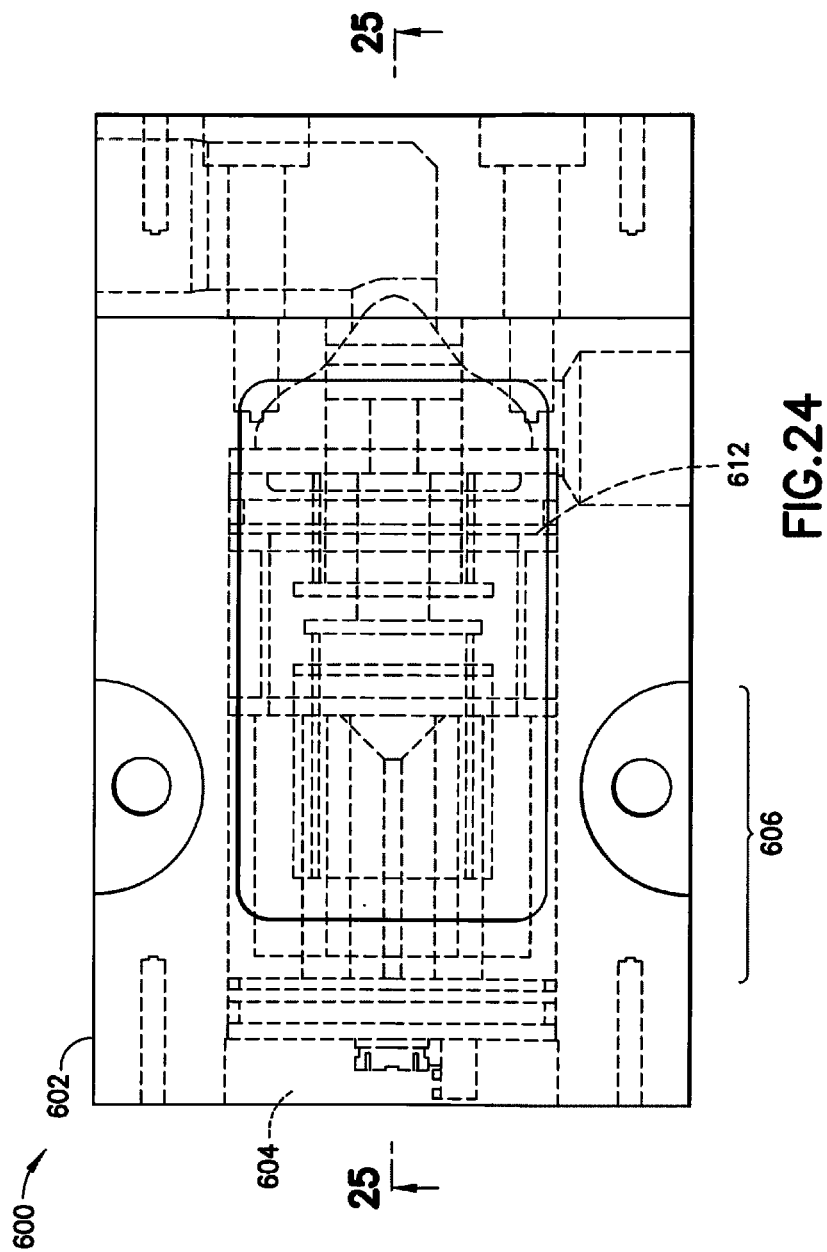
FIG. 24 is a partial section view of another exemplary valve used in the suspension system shown in FIG. 2.
Figure 25:
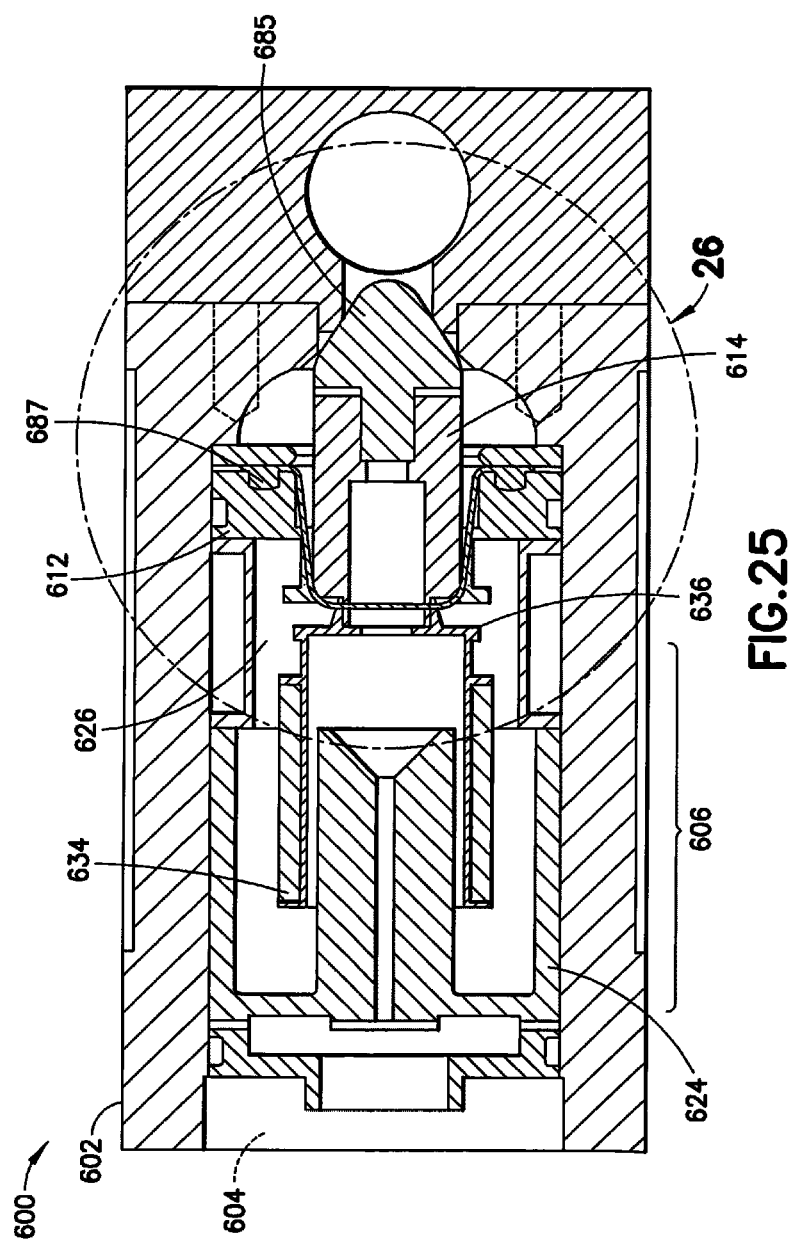
FIG. 25 is a cross section view of the exemplary valve shown in FIG. 24 taken along lines 25-25.
Figure 26:
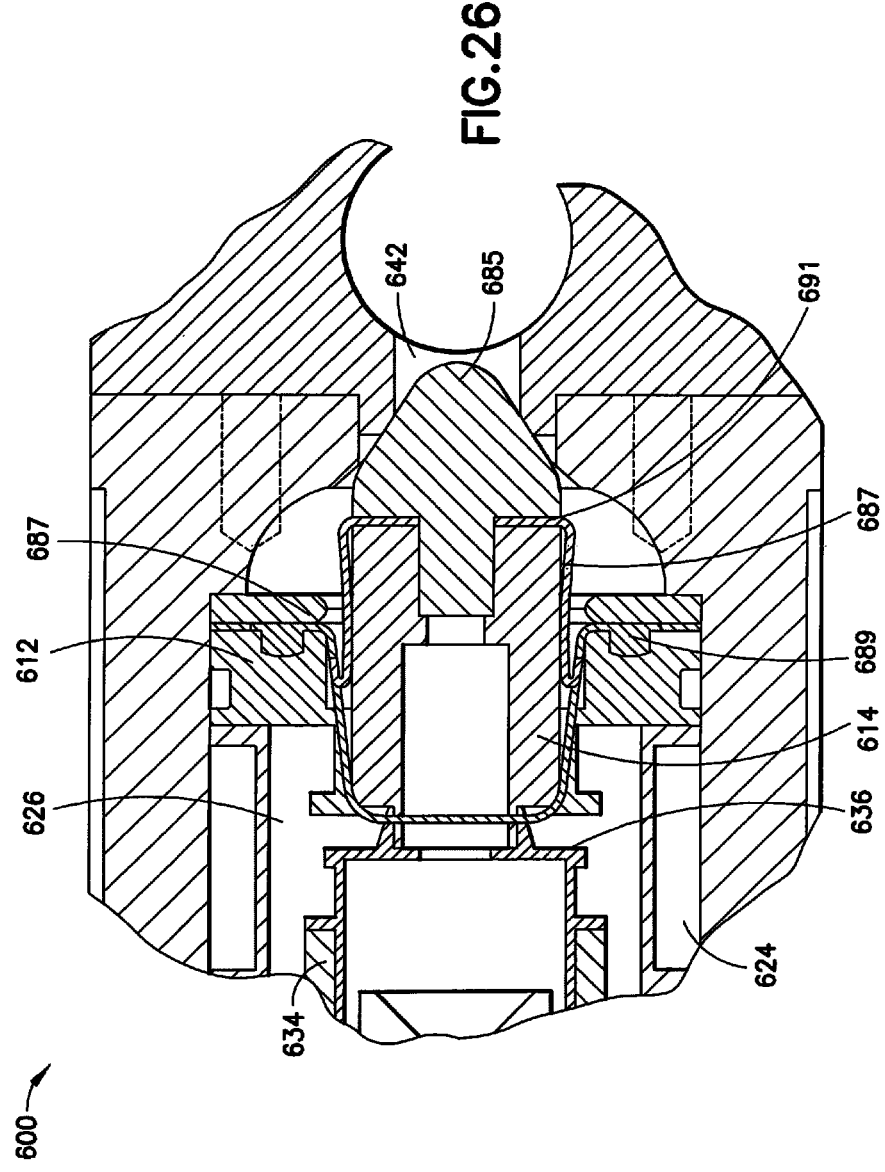
FIG. 26 is an enlarged view of the exemplary valve shown in FIG. 25.

Referring now also to FIGS. 24-26, a controlled valve (or EFCS) 600 according to another embodiment of the invention is illustrated.

The controlled valve 600 includes a valve body 602, electronic circuitry 604, a valve actuator 606, a stationary sleeve 612, a movable spool 614, a valve member 685, and a diaphragm 687.

The electronic circuitry 604 may be provided at a top end of the valve body similar to the controlled valve 100, 200, 300, 400.

The valve actuator 606 may be disposed within a cavity 624 of the valve body proximate the top end. The valve actuator 606 may include a coil header assembly 626. The coil header assembly 626 includes a base portion 634 and a voice coil portion 636. The voice coil portion 636, which may comprise an electromagnetic armature, extends from the base portion 634. The valve actuator operates in a similar fashion as described above for the valve actuator of the controlled valve 100, 200, 300, 400.

The stationary sleeve 612, and the movable spool 614 are configured similar to that of the controlled valve 100, 200, 300, 400. However, the valve 600 further comprises the valve member 685 attached to an end of the spool 614, and a diaphragm 687 connected between the sleeve 612 and the spool 614.

The valve member 685 may be provided for covering or uncovering an opening 642 within the valve 600.

The diaphragm 687, which may be a rolling type diaphragm for example, may be attached to the sleeve 612 at one end 689, and to the spool 614 at another end 691. Additionally, the diaphragm 687 may be attached between the spool 614 and the valve member 685 (at the end 691). The diaphragm 687 provides for a movable membrane configuration which isolates the actuator assembly 606. The diaphragm 687 may, for example, isolate the valve actuator assembly from oxygen or hydrogen within the system. The diaphragm may also isolate the valve actuator assembly from hydraulic fluid within the system. In this example, the actuator assembly may be referred to as an isolated actuator assembly.

Figure 27:
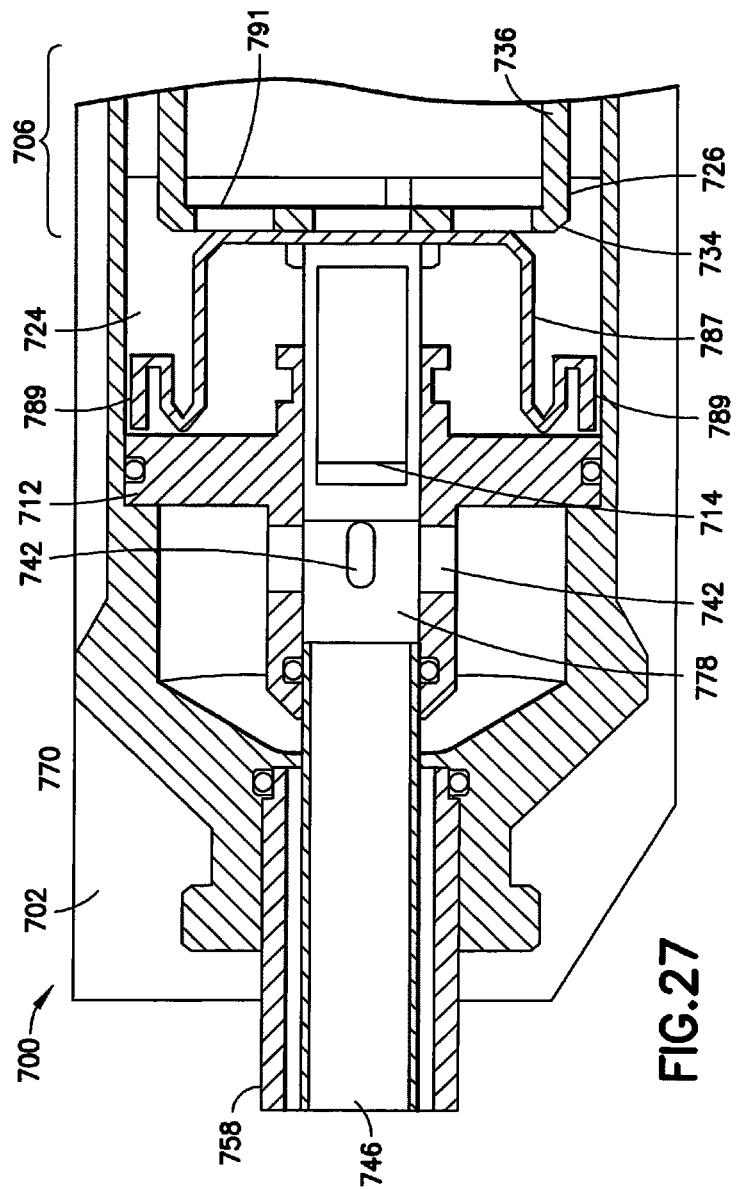
FIG. 27 is a partial section view of another exemplary valve used in the suspension system shown in FIG. 2.

Referring now also to FIG. 27, a controlled valve (or EFCS) 700 according to another embodiment of the invention is illustrated.

The controlled valve 700 is similar to the valve 400. The controlled valve includes a valve body 702, electronic circuitry (not shown), a valve actuator 706, a stationary sleeve 712, and a movable spool 714. However, the valve 700 further includes a diaphragm 787.

The valve actuator 706 may be disposed within a cavity 724 of the valve body 702 proximate the top end. The valve actuator 706 may include a coil header assembly 726. The coil header assembly 726 includes a base portion 734 and a voice coil portion 736. The voice coil portion 736, which may comprise an electromagnetic armature, extends from the base portion 734. The valve actuator assembly 706 operates in a similar fashion as described above for the valve actuator assembly 406 of the controlled valve 400.

The stationary sleeve 712, the movable spool 714, the outer chamber 770, and the lower chamber 778 are configured similar to that of the controlled valve 400. Additionally, similar to the valve 400, the inner chamber 778 is connected to the inner tube 746, the outer tube 758 is connected to the outer chamber 770, and the inner tube 758 and the outer tube 746 are in communication with each other through the openings 742.

The diaphragm 787 may be a rolling type diaphragm, for example. The diaphragm 787 may be attached to the sleeve 712 and/or the valve body 702 at one end 789 of the diaphragm 787. The diaphragm 787 may be attached to the spool 714 at another end 791 of the diaphragm 787. Additionally, the diaphragm 787 may be attached between the spool 714 and the coil header assembly 726 at the end 791. It should be noted that the diaphragm may be attached to the components of the valve 700 in any suitable fashion. The diaphragm 787 provides for a movable membrane configuration which isolates the actuator assembly 706. The diaphragm 787 may, for example, isolate the valve actuator assembly 706 from oxygen or hydrogen within the system. The diaphragm 787 may also isolate the valve actuator assembly 706 from hydraulic fluid within the valve system. In this example, the actuator assembly 706 may be referred to as an isolated actuator assembly. However, the diaphragm may be configured to suitably isolate any fluid from the valve actuator assembly. For example, the diaphragm may isolate fluids flowing through the inner and outer tubes 746, 758 such that the cavity 724 is isolated. However, any suitable configuration may be provided.

According to various embodiments of the invention, a voice coil coupled to a valve and having significant advantages over conventional configurations may be provided. In particular, in one embodiment, the controlled valve (or oil control valve) may provide a substantially fast response, such as about less than 6 ms (milliseconds), for example. The valve may also provide a substantially small outer geometry (or dimensional envelope), such as about less than 32 mm in diameter, for example.

The oil control valve may include a control fluid such as Golden Specta Damper Oil. However, any suitable control fluid may be provided. The valve may also include various characteristics such as proportional flow control, a max flow area of about 34 square millimeters (mm$^2$), and bi-directional flow. However, any suitable characteristics may be implemented.

Power for the valve may be about 15V, and the valve may be configured for minimal power consumption (such as a battery powered application, for example). Additionally, the valve may be configured to communicate of I2C (a simple bi-directional two-wire bus for efficient inter-IC (integrated circuit) control; this bus is called the Inter-IC or I2C). Additionally, the disclosed valve configuration may provide for minimal leakage in the fully closed position.

In various embodiments, the valve may be implemented in a shock or suspension system, such as for a bicycle. However, alternate embodiments may include the valve in any suitable type of system. For example, the valve may be provided in any other suitable type of suspension system for any vehicle, such as an automobile for example. In another example, the valve may be used in an active damper system for a structure.

According to various embodiments of the invention, the controlled valve may also provide further advantages by comprising configurations having features which alleviate any tendencies to shut during rapid fluid damper transients. Preventing or minimizing valve 'locking' during fluid transients, is advantageous as valve "locking" may be undesirable in a suspension system.

Additionally, it should be noted that the valve may provide compensation for bulk fluid temperatures. For example, the control algorithm may assume a particular viscosity for the sensed oil temperature. This may provide for an approximate constant performance for a given change in oil temperature or viscosity.

Various embodiments of the invention provide configurations which minimize excessive mass within the valve. The moving element may include the spool element, the header element, and the coil element, for example. The spool element may be tightly matched (e.g., 100 micro-inches) to limit leakage in the closed position; this is typically accomplished with hardened Ss (stainless steel). Lighter materials (i.e., aluminum) are generally too soft in their native state to provide adequate wear resistance. Other light materials (i.e., titanium) generally have poor wear characteristics and are expensive. In dynamic, high performance, mechanical systems, it is generally desirable to reduce the mass of all moving elements. It is advantageous in any moving mass system to minimize the mass in order to enhance the ability of the actuator system to accelerate and control this mass. A simplified equation is provided:

$$F_{Coil} = F_{Friction} + ma + F_{FluidForces} + F_{Other}.$$

It is plainly clear from this equation that a higher coil force would be required to accelerate a higher mass element. Generally, higher coil forces are generated by consuming more electrical power or complicating the motor design (making it more efficient). In general, it is good design practice to minimize the mass as much as possible while not increasing the cost dramatically. Generally, machining parts from aluminum with very thin structural elements results in light, inexpensive parts for use on the movable assembly. The spool and sleeve elements are in an exemplary embodiment machined from aluminum and finished with hard anodize with a follow-on grinding/matching process to achieve a uniformly close tolerance fit. There is little opportunity to decrease the mass of the coil as efforts to decrease the mass are outweighed by the other design trade-offs so copper coil wire is the typical choice.

Figure 28:
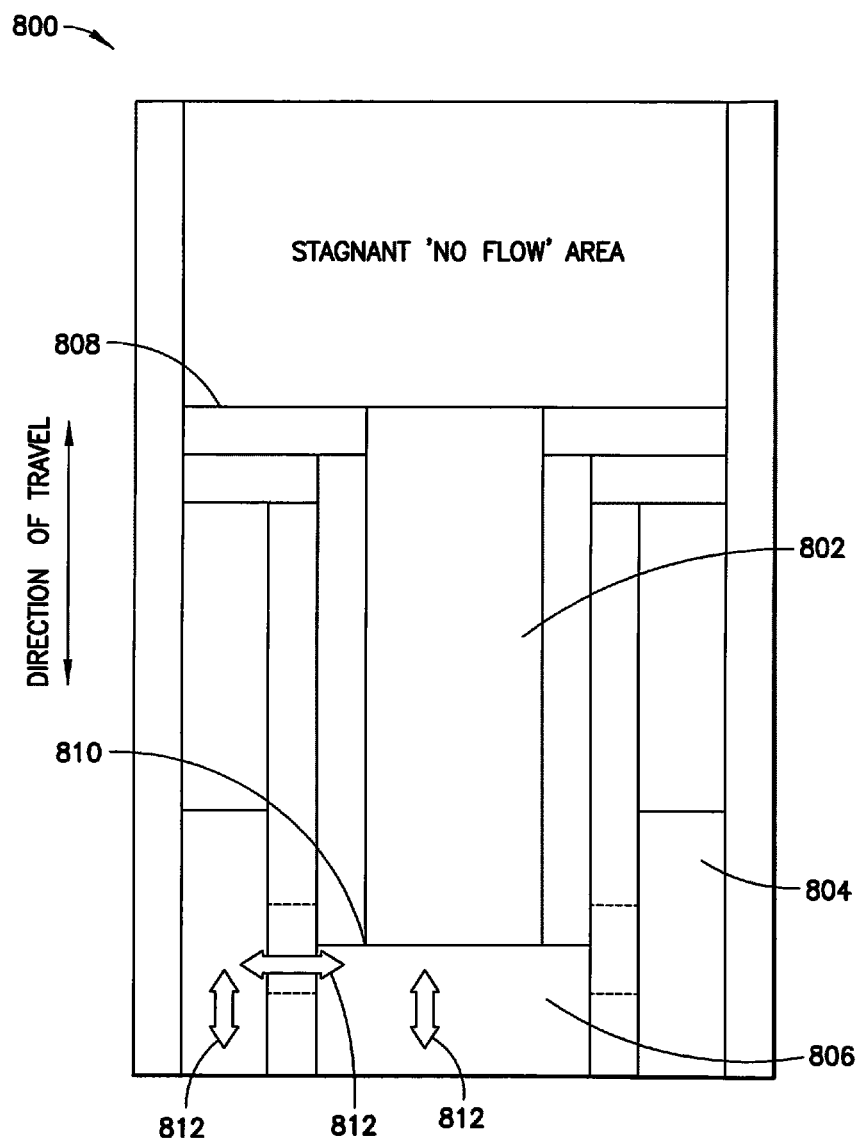
FIG. 28 is a diagram of a portion of another exemplary valve used in the suspension system shown in FIG. 2.

Various embodiments of the invention provide configurations which minimize differential pressure across movable part faces within the valve. This concept involves axial forces that may be developed when temporary changes in fluid pressure cause pressure transients that travel through the fluid at the speed of sound and result in momentary pressure differential that act on faces normal to the direction of travel. This is shown in FIG. 28, which shows a simplified diagram of valve internals of an exemplary valve 800. The valve 800 includes a moving element 802, and active flow chambers 804, 806. A moving element stagnant condition is shown at 808. A moving element exposed condition is shown at 810. Arrows 812 illustrate flow within the active flow chambers. In one embodiment, frontal area normal to the direction of travel may be reduced in order to alleviate the differential pressure.

It may be unlikely that pressure differences due to pressure waves traveling through the fluid would result in differential forces of any significant duration or magnitude (pressure throughout a fluid is uniform at steady-state and is only non-uniform during pressure excursions at a point as the fluid is compressed and this pressure is transmitted at the speed of sound throughout the fluid). The speed of sound in air is approximately 390 m/s and much higher for higher density fluids; it should take mere micro-seconds for fluid pressure to equalize on all internal faces of the device during a pressure transient. Nonetheless, in various embodiments of the invention, frontal areas of all movable elements are reduced as a matter of good-engineering practice to minimize the fluidic drag coefficient as the movable elements traverse through a viscous medium.

Figure 29:
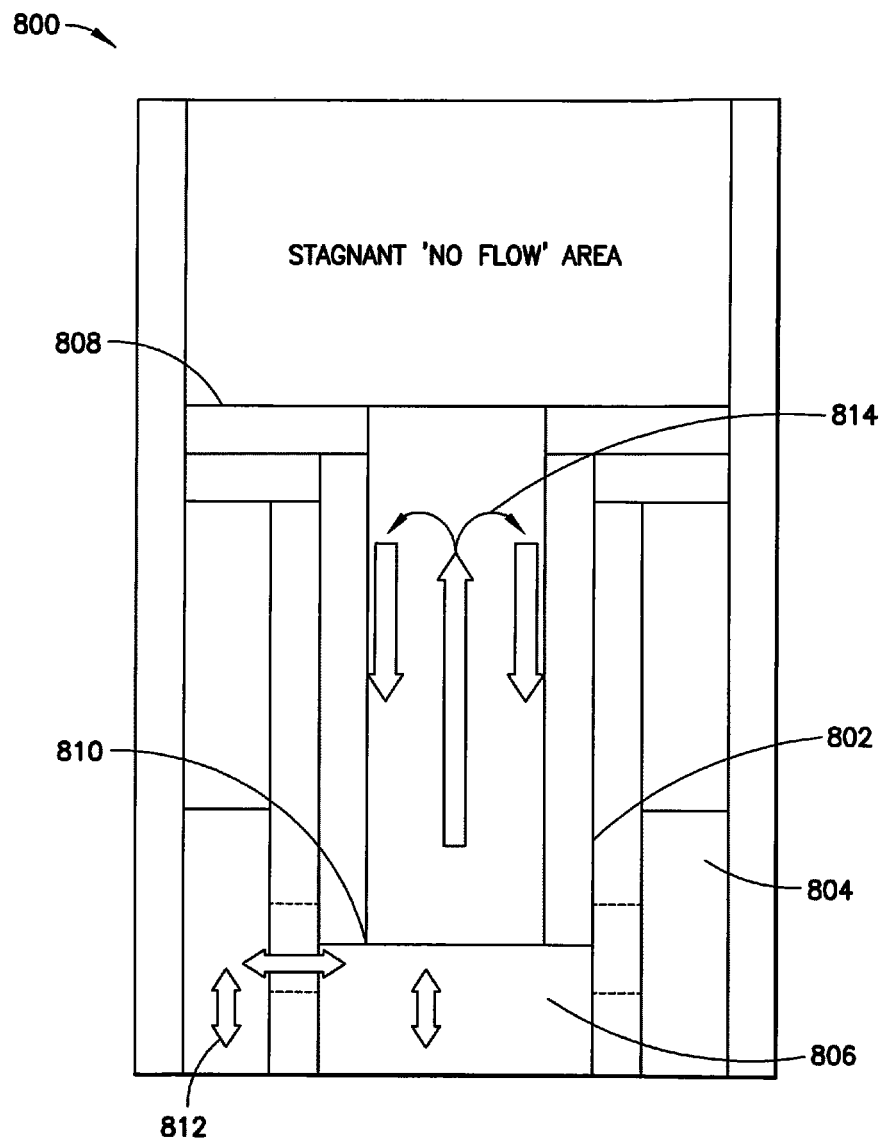
FIG. 29 is another diagram of a portion the exemplary valve shown in FIG. 28.

Various embodiments of the invention provide configurations which minimize flow vortices in unexpected areas of the valve internals. Flow vortices could exist in valve 'dead leg areas' where energy is extracted from the flowing fluid and exerts unbalanced pressures on some faces due to fluid inertia (molecular impact as fluid transfers kinetic energy to parts). There could also exist flow vortices such that flow might be in one direction on the axis but the opposite direction on the periphery such that the net flow is zero. The net effect would result in drag around the periphery between the fluid and the part surface that would create undesirable forces (similar to head loss in a pipe). Exemplary flows 812 in the valve are shown in FIG. 29. A head loss flow vortex with zero net is illustrated at 814.

Computational Fluid Dynamics (CFD) software may be used to analyze the potential for flow vortices is areas that may tend to cause valve motion. In various embodiments of the invention, configurations are provided which minimize the likely hood of flow vortices near moving elements to the maximum extent practical.

Various embodiments of the invention provide configurations which minimize the effects of fluid inertia acting on movable valve elements within the valve. Any matter that must accelerate must undergo acceleration (e.g., a force must be exerted). The fluid flow path requires at least one 180 degree turn, therefore, the fluid must undergo accelerations. At higher fluid flows, these accelerations are higher. Ultimately, these acceleration forces may be imposed by the internals of the valve. If any of these internal valve elements are movable, then a potential for unbalanced forces exist. This may be studied by examining CFD (computational fluid dynamics) and looking for flow velocities normal to movable surfaces.

Figure 30:
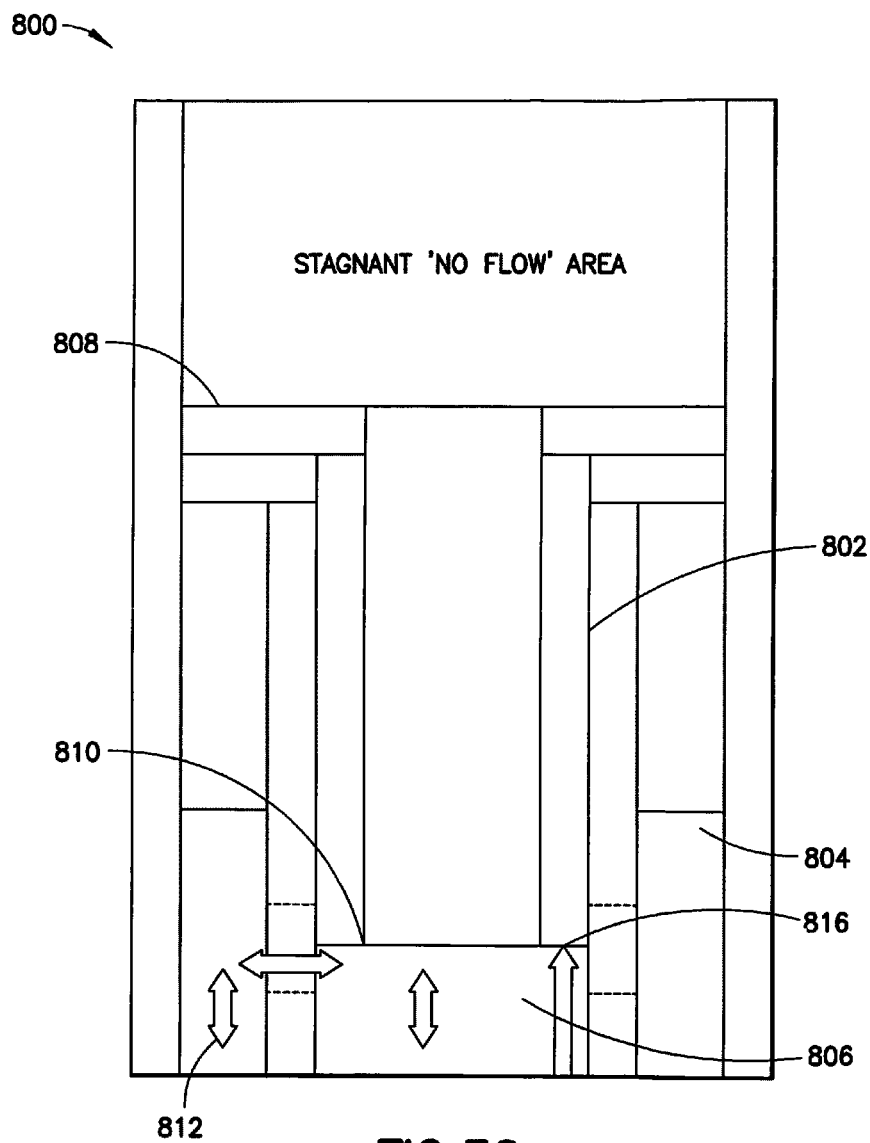
FIG. 30 is another diagram of a portion the exemplary valve shown in FIG. 28.
Figure 31:
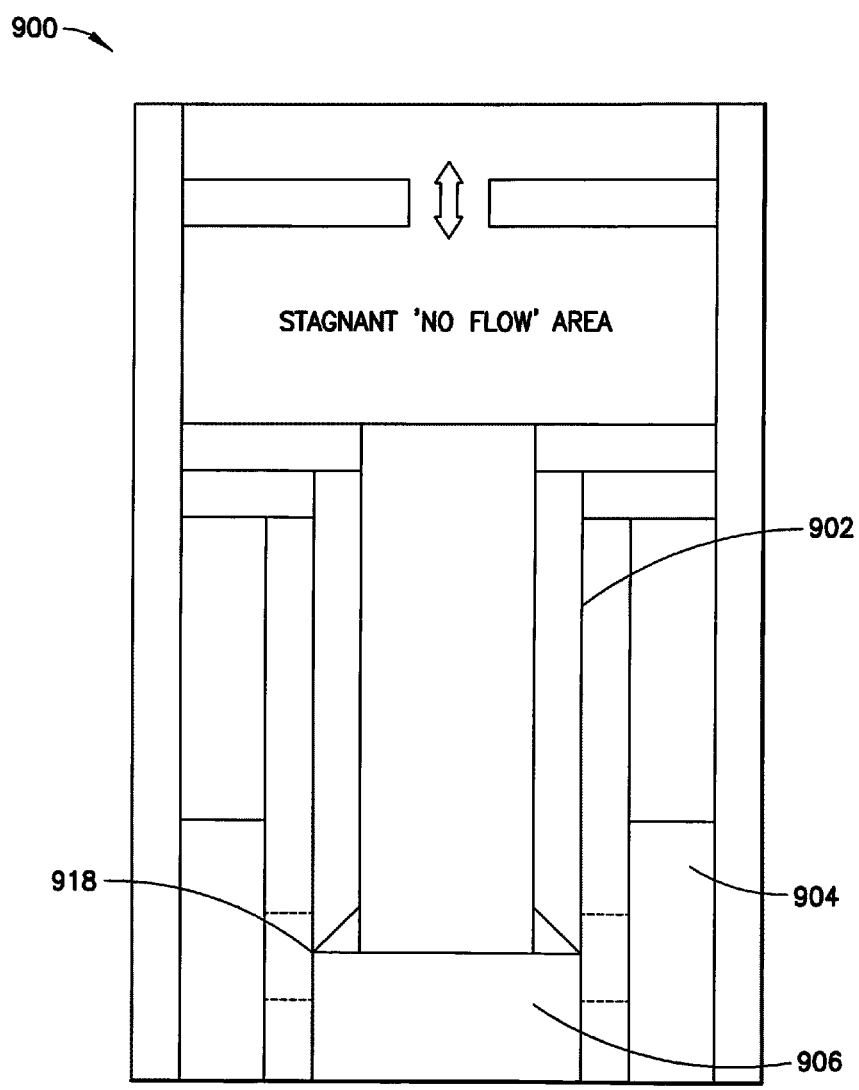
FIG. 31 a diagram of a portion of another exemplary valve used in the suspension system shown in FIG. 2.

In the diagram of FIG. 30, the impact surface shown at 816 and forces exerted by the flowing fluid on these impact surfaces may tend to open the valve. To help minimize this effect, the frontal area of the spool was decreased in various embodiments of the invention by an added chamfer 918 (see diagram in FIG. 31 illustrating valve 900).

These impact forces should follow the dynamic pressure equation:

$$P_{Dynamic} = \frac{1}{2}\rho v^2.$$

For a given fluid, higher fluid flows might impart dynamic pressure as the square of the fluid velocity (e.g., directly proportional to fluid flow).

Figure 32:
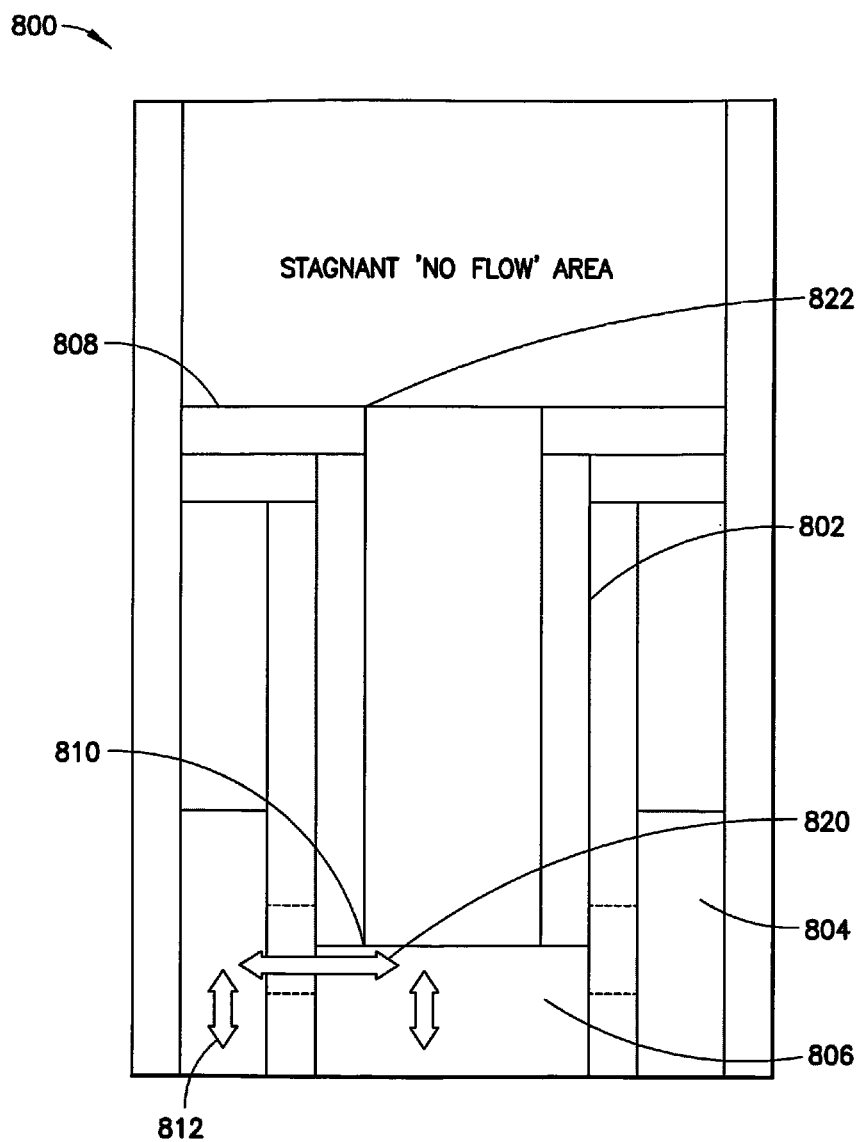
FIG. 32 is another diagram of a portion the exemplary valve shown in FIG. 28.

Various embodiments of the invention provide configurations which minimize the effects of fluid flow parallel to valve element faces within the valve. Similar to an airplane wing, as fluid flows across a surface when the velocity of fluid flow on the opposing surface is different, a differential force can be created (similar to lift in airplanes). This effect is proportional to fluid density, fluid velocity, and area exposed to the moving fluid. FIG. 32 shows an example of velocities across various surfaces of the exemplary valve. A high velocity flow across a surface is shown at 820. An equal surface with zero velocity flow is shown at 822. Minimizing area exposed to 'cross flow' may be provided since the fluid acting on both surfaces is the same and, for a particular valve design, the required flow for given valve openings is specified (therefore, fluid velocity is defined). Various embodiments of the invention minimize the frontal area by reducing the number of the flow holes (which may not be desirable since the valve must achieve some maximum flow when open) or thinning of the spool wall near the flow area.

With this type of effect present, fluid flowing in either direction may tend to shut the valve (movable elements would move down in image). Likewise, a lower density fluid would result in a lower magnitude of force (i.e. compressed air should exhibit a similar force on a much smaller scale). It has been found that larger surface areas and higher flows (e.g., resultant higher velocity) resulted in higher forces exerted on the flat surfaces.

This effect can be explained by using the Bernoulli principle and total pressure equation:

$$P_1 + \frac{\rho_1 v_1^2}{2} = P_2 + \frac{\rho_2 v_2^2}{2}$$

where P1 and P2 are defined by the bulk fluid pressure and are equivalent for most conditions. The fluid velocity and fluid density can affect the differential forces acting on opposing faces.

Velocity—As the fluid flow increases, the velocity increases proportionally for a given flow area. As the valve area is reduced, the velocity must increase to maintain the same fluid flow and the effect on pressure is proportional to the square of the ratio change in velocity. For example, if a valve has 1 gpm (gallon per minute) flowing through at 100 percent open, there will be a corresponding fluid velocity. If the valve is shut to 10 percent of the previous flow area, the fluid velocity must increase 10× in order to maintain a constant fluid flow; this will result in a 100× impact on Bernoulli pressure effects.

Density—Incompressible fluid density is dependant on no less than two parameters—temperature and composition. If we assume that the fluid composition is homogeneous, then temperature gradients in the fluid acting on opposing faces could result in differential forces acting on the movable valve elements. It is well known that as a fluid flows through a restriction from a region of high pressure to a region of low pressure, energy is converted to heat at the fluid restriction. It is conceivable that locally high temperatures at the valve area interface could result in a local drop in fluid density at the leading edge of the valve element which would result in a differential force acting on the movable element (as the thermal exchange is proportional to flow, higher flows would result in higher pressure differentials). Once the local flow restriction is passed, the small quantity of fluid that was heated to a relatively high temperature would mix with the fluid bulk and cause a very small and difficult to measure temperature rise. Additionally, if there are very small air bubbles in suspension that flow through the valve intermittently, rapid decreases in fluid density could be experienced which would result in rapid reductions in pressure and create a differential force on the movable element.

Additionally, the equation for lift of an airplane wing is analogous:

$$F_{Lift} = C_{Lift} \frac{\rho v^2}{2} A$$

Here, the addition of the terms CLift and A indicate the 'coefficient of lift' and the 'lift area' respectively. The coefficient of lift must be empirically determined and would be constant for a fixed geometry. The area exposed to the fluid flow conditions has a direct relationship to the magnitude of the lift created.

Valve design goals may dictate the fluid flows required and the resultant fluid velocities. The fluid selection may also determine the fluid density. In various embodiments of the invention, density effects from localized heating may be difficult to compensate for and are smaller effect.

The area exposed to the flowing fluid for lift to act upon as well as the coefficient of lift in the region of flow can be manipulated by design to minimize these effects. It is desirable to introduce design changes to the valve elements such that equal and opposite forces are present at all valve positions and flow conditions.

Various embodiments of the inventions include further advantages such as thinning of the spool edges further and lengthening of the chamfer to minimize the lift effect and area of interaction.

Various embodiments may also provide improved configurations by providing fewer slots that are longer (movable element stroke is increased as exposed area is decreased; for example, if there were 12 holes of diameter X, then decreasing the number holes to 4 and expanding their length to three times the hole diameter will result in ⅓rd the exposed area, three times the valve stroke, and an equal total flow area when fully open), as opposed to providing circumferentially oriented holes for fluid flow and throttling.

Additionally, various embodiments may include improvements by reversing the chamfer on the spool, the flowing fluid would tend to impact at an angle and force the spool element to open in opposition to its current tendency to close. By selecting this geometry carefully, one could greatly minimize the tendency of the valve to close under low flow area, high flow conditions (effectively using angle of attack to cause lift in the opposite direction).

Advantages are also achieved in the various embodiments by modifying the sleeve and/or spool geometry to direct flow such that resultant forces are cancelled.

Further, controls systems approach where fluid flow or some analogous form of fluid flow is inserted as a proxy to estimate actual counter forces being exerted. For example, if fluid flow exerted a force downward on the spool in a non-linear manner (maximum disturbance force at 25 percent valve open and curvilinear toward 0 percent and 100 percent), then this force could be characterized and appropriate coil current could be programmed to be applied equal and opposite to the flow forces based on characterization (by increasing coil current, we increase the force applied; the polarity of coil current and magnitude needed are all that is required to effectively compensate for this effect). In a damper suspension system, this is quite simply done by communicating the piston velocity (already available in usable form) to the valve controller. Since piston diameters are consistent through-out the travel of the damper, velocity is directly proportional to fluid flow. If acceleration were also available, the rate of change of fluid flow would be available (which may afford some additional advantage).

Various embodiments of the invention provide configurations which minimize deformation of the valve elements during applied differential pressures within the valve. Any flow control device will invariably exhibit a pressure-drop to fluid flow relationship (typically, for a given device and given flow, smaller valve opening will result in higher differential pressures). Since pressure acting on an area results in a force, high differential pressures between the inner and outer flow chambers could result in forces on mechanical elements which in turn will cause them to flex according to standard stress analysis. Since the valve elements are of very tight tolerance (~100 micro-inches), any temporary deformation could result in binding of moving mechanical elements. This effect could explain the tendency for the valve to 'lock', however, it will not explain the tendency for the valve to shut initially during flow transients. Various embodiments of the invention provide for minimized deformation of valve elements by including material selection and thickness that is appropriate for all operating conditions.

Figure 33:
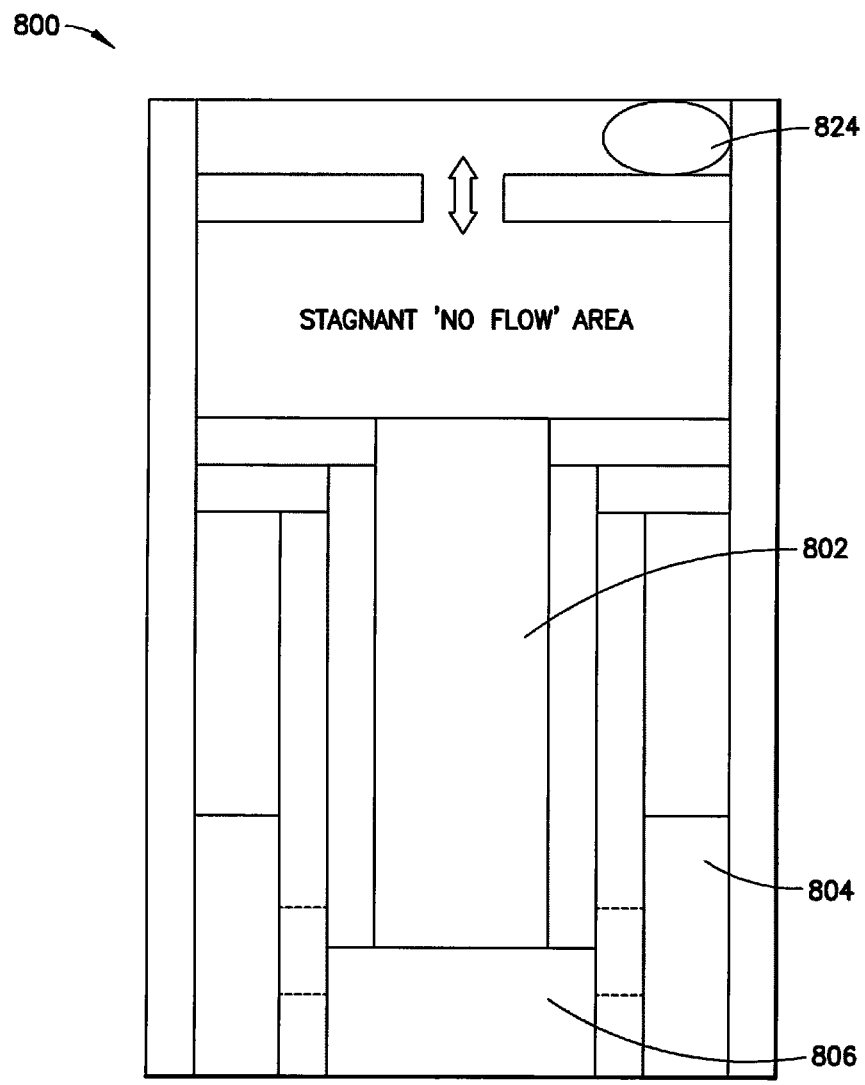
FIG. 33 is another diagram of a portion of the exemplary valve shown in FIG. 28.

Various embodiments of the invention provide configurations which minimize air bubbles or air pockets in undesirable/un-predictable locations within the valve. In a device that is completely fluid filled, it is possible the poor practices (e.g., loosening and tightening a bleed screw; improper procedures during construction, leading to air in the device), leakage, or trapped air bubbles could exist after assembly and venting. In the image shown in FIG. 33, a possible area where trapped air could accumulate is in the top of the valve mechanism shown at 824.

As fluid pressure decreases in the inner flow chamber, the pressure in the fluid area above the stagnant 'no flow' area will experience the same pressure. As a result, the air bubble will expand in volume due to the lower fluid pressure. Conversely, increased pressure in the inner flow chamber will have the opposite effect. As a result, fluid will flow into and out of the upper region in response to the expanding and contracting of the trapped air bubble (there could be many bubbles of various sizes in different locations; in this example, this effect is treated as a 'lumped' air bubble). This un-predictable flow element could result in derivative forces being exerted on un-analyzed faces due to any of the means mentioned above.

Various embodiments of the invention provide a sealed fluid to environment interfaces and careful assembly/process controls which minimize or eliminate the potential for unwanted, trapped air on valve internals.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A controlled valve comprising:
a valve body comprising a top end, a bottom end, and a receiving area proximate the bottom end;
a sleeve between the top end and the bottom end, wherein the sleeve comprises an inner bore and at least one opening, wherein the inner bore extends from a first end of the sleeve to a second end of the sleeve, and wherein the at least one opening extends through the second end of the sleeve;
a valve body base comprising a first end and a second opposite end, wherein the sleeve is attached to the first end of the valve body base, and wherein the second end of the valve body base is configured to receive a first conduit;
a spool movably disposed within the inner bore of the sleeve, wherein the spool is configured to be movable in a first direction; and
an electromagnetic valve actuator assembly attached to the spool, wherein the electromagnetic valve actuator assembly is inside the valve body and proximate the top end of the valve body;
wherein the valve is configured to receive a second conduit at the receiving area, wherein the valve is configured to provide for fluid communication through the at least one opening, wherein the spool is configured to be movable over at least a portion of the at least one opening to regulate fluid flow therethrough, and wherein the valve is configured to provide a fluid flow at the bottom end of the valve body that is substantially parallel to the first direction.

2. The controlled valve of claim 1 further comprising a first fluid conduit connected to the valve body base and a second fluid conduit connected to the receiving area of the valve body.

3. The controlled valve of claim 2 wherein the second conduit surrounds the first conduit.

4. The controlled valve of claim 1 wherein the at least one opening comprises an annular array of openings.

5. The controlled valve of claim 4 wherein each of the openings in the annular array of openings comprises a circular, slotted, square, rectangular, triangular, or any other suitable type shape.

6. The controlled valve of claim 1 wherein the electromagnetic valve actuator assembly comprises a coil header assembly having a base portion, wherein the base portion is directly attached to the spool, wherein the spool is configured to be movable in a first direction in response to a movement of the coil header assembly in the first direction, and wherein the spool is configured to be movable in a second direction in response to a movement of the coil header assembly in the second direction.

7. The controlled valve of claim 6 wherein the valve is electronically controlled.

8. The controlled valve of claim 1 wherein the sleeve is fixedly disposed within the valve body.

9. The controlled valve of claim 1 wherein an end of the spool proximate the valve body base comprises a narrowing profile shape.

10. The controlled valve of claim 1 wherein the valve is configured to have the first conduit at the second end of the sleeve.

11. The controlled valve of claim 1 wherein a portion of the second end of the sleeve is between the first end and the second end of the valve body base.

12. The controlled valve of claim 1 wherein the valve is configured to have an end of the first conduit disposed between is between a portion of the second end of the sleeve and an end of the spool.

13. The controlled valve of claim 1 wherein the valve body base is configured to be between the second conduit and the movable spool.

14. The controlled valve of claim 1 wherein the valve is configured to provide for fluid communication between the first conduit and the second conduit through the at least one opening.

15. The controlled valve of claim 1 wherein the valve is configured to provide a fluid flow at the second end of the valve body base that is substantially parallel to the first direction.

16. The controlled valve of claim 1 further comprising electronic circuitry proximate the top end of the valve body, wherein the electronic circuitry is connected to the electromagnetic valve actuator.

17. The controlled valve of claim 16 further comprising a position sensor at the sleeve, wherein the position sensor is connected to the electronic circuitry.

18. The controlled valve of claim 17 wherein the position sensor is connected to the electronic circuitry by a printed circuit board.

19. The controlled valve of claim 18 wherein one end of the printed circuit board is at the electronic circuitry, and another end of the printed circuit board is at the sleeve.

20. A valve comprising:
a valve body comprising a top end, a bottom end, and an opening proximate the bottom end;
a stationary valve element inside the valve body, wherein the stationary valve element comprises an inner bore and at least one hole, wherein the inner bore extends from a first end of the stationary valve element to a second end of the stationary valve element, and wherein the at least one hole extends through the second end of the stationary valve element;
a movable valve element adapted to move in a first direction, wherein the movable valve element is adapted to be movable over at least a portion of the at least one hole to regulate fluid flow therethrough;
a valve actuator assembly connected to the movable valve element;
a first conduit receiving area, wherein the first conduit receiving area is adapted to receive an open end of a first fluid conduit; and
second conduit receiving area, wherein the second conduit receiving area is adapted to receive an open end of a second fluid conduit, and wherein the second conduit receiving area is substantially concentric to the first conduit receiving area;
wherein the valve is adapted to receive the first fluid conduit through the opening, wherein the valve is adapted to receive the second fluid conduit through the opening, and wherein the valve is adapted to provide a fluid flow direction proximate the bottom end of the valve that is substantially parallel to the first direction.

* * * * *

UNITED STATES PATENT AND TRADEMARK OFFICE
CERTIFICATE OF CORRECTION

| | |
|---|---|
| PATENT NO. | : 8,763,639 B2 |
| APPLICATION NO. | : 12/154054 |
| DATED | : July 1, 2014 |
| INVENTOR(S) | : Cook et al. |

Page 1 of 1

It is certified that error appears in the above-identified patent and that said Letters Patent is hereby corrected as shown below:

In the Claims:

In Claim 20:
Column 20, line 61, "second conduit receiving area" should be deleted and --a second conduit receiving area-- should be inserted.

Signed and Sealed this
Thirtieth Day of September, 2014

Michelle K. Lee
*Deputy Director of the United States Patent and Trademark Office*